United States Patent
Kal et al.

(10) Patent No.: US 10,337,787 B2
(45) Date of Patent: Jul. 2, 2019

(54) VACUUM INSULATION PANEL, METHOD OF MANUFACTURING VACUUM INSULATION PANEL, AND REFRIGERATOR INCLUDING VACUUM INSULATION PANEL

(71) Applicant: Samsung Electronics Co., Ltd., Suwon-si (KR)

(72) Inventors: Seung Hoon Kal, Uiwang-si (KR); Se Won Yook, Seoul (KR); Jin Hyun Park, Osan-si (KR); Hae Yong Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 15/549,955

(22) PCT Filed: Feb. 4, 2016

(86) PCT No.: PCT/KR2016/001221
§ 371 (c)(1),
(2) Date: Aug. 9, 2017

(87) PCT Pub. No.: WO2016/129859
PCT Pub. Date: Aug. 18, 2016

(65) Prior Publication Data
US 2018/0031304 A1    Feb. 1, 2018

(30) Foreign Application Priority Data

Feb. 9, 2015   (KR) .................. 10-2015-0019302
Feb. 3, 2016   (KR) .................. 10-2016-0013281

(51) Int. Cl.
*F16L 59/065*   (2006.01)
*F25D 23/06*    (2006.01)
(Continued)

(52) U.S. Cl.
CPC .............. *F25D 23/06* (2013.01); *B32B 9/005* (2013.01); *B32B 17/02* (2013.01); *B32B 17/064* (2013.01);
(Continued)

(58) Field of Classification Search
CPC .... Y10T 428/231; F16L 59/065; E04B 1/803; F25D 2201/14; Y02B 80/12
See application file for complete search history.

(56) References Cited

U.S. PATENT DOCUMENTS 8,475,576 B2 * 7/2013 Markowz ............... B01J 20/041
96/108
2003/0157284 A1   8/2003 Tanimoto et al.
(Continued)

FOREIGN PATENT DOCUMENTS

CN    104132220    11/2014
EP    0715138      6/1996
(Continued)

OTHER PUBLICATIONS

International Search Report dated May 19, 2016 in corresponding International Application No. PCT/KR2016/001221.
(Continued)

*Primary Examiner* — Alexander S Thomas
(74) *Attorney, Agent, or Firm* — Staas & Halsey LLP

(57) ABSTRACT

Disclosed is a refrigerator including a vacuum insulation panel. The vacuum insulation panel includes a core material, a covering material disposed outside the core material to form an accommodation space in which the core material is accommodated and a first adsorbent disposed in the accommodation space to be activated at a temperature higher than room temperature and to remove at least one of gases and water present in the accommodation space.

19 Claims, 27 Drawing Sheets

(51) Int. Cl.
  *B32B 17/02* (2006.01)
  *B32B 9/00* (2006.01)
  *B32B 17/06* (2006.01)
  *B32B 27/08* (2006.01)

(52) U.S. Cl.
  CPC ............ *B32B 17/067* (2013.01); *B32B 27/08* (2013.01); *F16L 59/065* (2013.01); *B32B 2262/101* (2013.01); *B32B 2307/304* (2013.01); *F25D 2201/14* (2013.01); *Y10T 428/231* (2015.01)

(56) References Cited

U.S. PATENT DOCUMENTS

| | | |
|---|---|---|
| 2011/0129398 A1 | 6/2011 | Markowz et al. |
| 2014/0178626 A1* | 6/2014 | Min .................. F16L 59/065 428/69 |

FOREIGN PATENT DOCUMENTS

| | | |
|---|---|---|
| EP | 1 505 359 A1 | 2/2005 |
| EP | 2676714 | 12/2013 |
| JP | 2006-125600 | 5/2006 |
| JP | 3126049 | 10/2006 |
| KR | 10-2013-0019966 | 2/2013 |
| KR | 10-2015-0012712 | 2/2015 |

OTHER PUBLICATIONS

Written Opinion of the International Searching Authority dated May 19, 2016 in corresponding International Application No. PCT/KR2016/001221.

Extended European Search Report dated Jan. 10, 2018 in European Patent Application No. 16749399.8.

European Notice of Allowance dated Dec. 6, 2018 in European Patent Application No. 16749399.8.

* cited by examiner

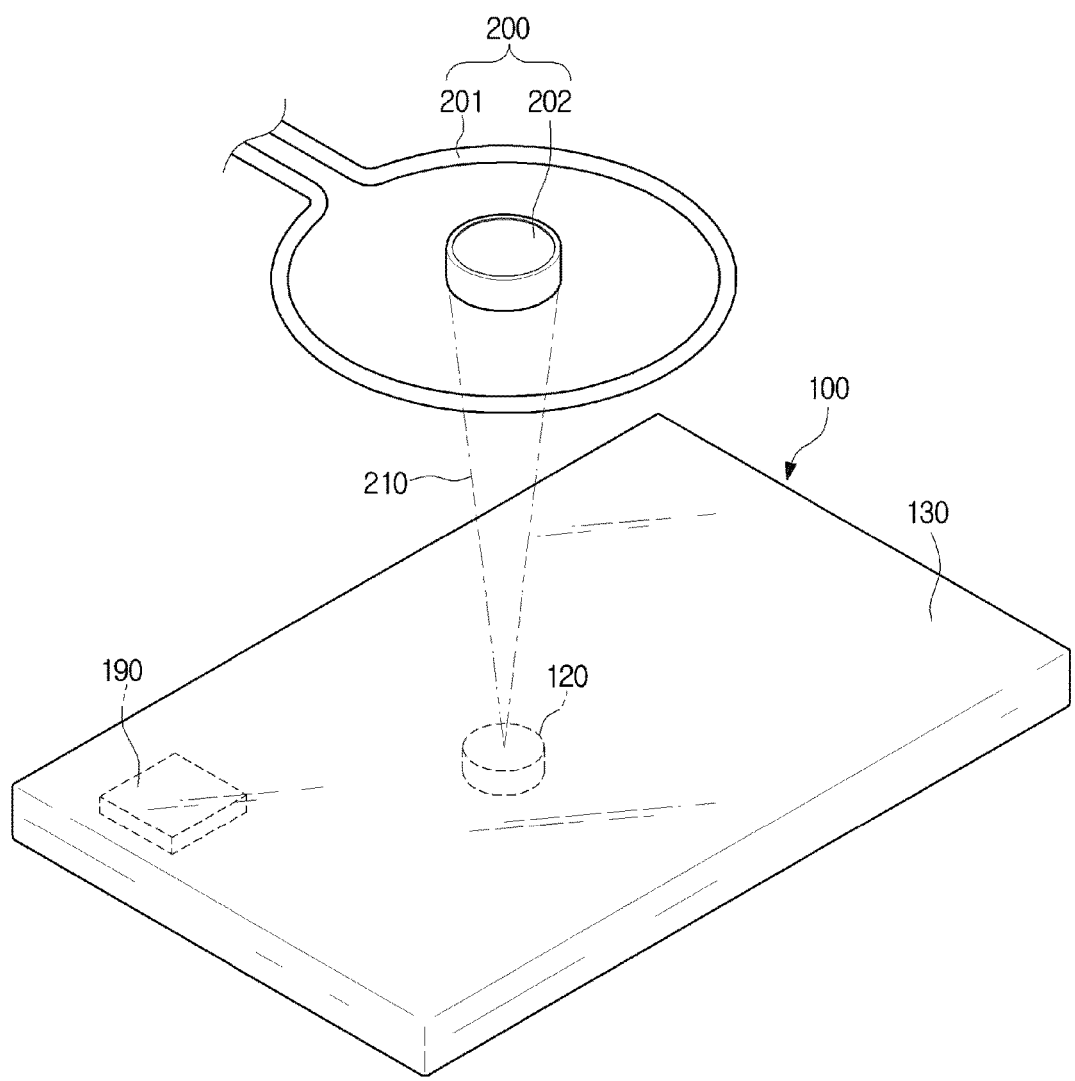

| 290*410*12mm³ | VACUUM PROCESS | MANUFACTURING TIME (MINUTE) | HEAT CONDUCTIVITY COEFFICIENT (Mv/Mw) |
|---|---|---|---|
| EXISTING VACUUM INSULATION PANEL | VACUUM CHAMBER | 25 | 1.66 |
| PRESENT INVENTION 1 | HIGH-FREQUENCY INDUCTION HEATING | 9.5 | 1.62 |
| PRESENT INVENTION 2 | | 10 | 1.6 |
| PRESENT INVENTION 3 | | 3 | 1.53 |
| PRESENT INVENTION 4 | | 2 | 1.57 |

VACUUM INSULATION PANEL, METHOD OF MANUFACTURING VACUUM INSULATION PANEL, AND REFRIGERATOR INCLUDING VACUUM INSULATION PANEL

CROSS-REFERENCE TO RELATED APPLICATION

This application is a U.S. National Stage Application, which claims benefit under 35 U.S.C § 371 of International Patent Application No. PCT/KR2016/001221 filed Feb. 4, 2016, which claims the foreign priority benefit under 35 U.S.C. § 119 of Korean Patent Application No. 10-2015-0019302 filed Feb. 9, 2015 and Korean Patent Application No. 10-2016-0013281 filed Feb. 3, 2016, the contents of which are incorporated herein by reference.

TECHNICAL FIELD

The present invention relates to a vacuum insulation panel, a method of manufacturing the vacuum insulation panel, and a refrigerator including the vacuum insulation panel, and more particularly, to a vacuum insulation panel having an improved structure capable of increasing insulation performance, a method of manufacturing the vacuum insulation panel, and a refrigerator including the vacuum insulation panel.

BACKGROUND ART

Energy consumed by humankind is limitative and global warming caused by carbon dioxide generated by using the energy is the greatest problem of humankind with an energy crisis. Accordingly, energy regulations of each country become tightened and an energy rating system with respect to home appliances is a permanent problem that manufacturers have. An energy rating system of the government which requires maximum efficiency using less energy well accords with needs of consumers who desire high internal capacity and low power consumption. Particularly, many studies with respect to refrigerators have been performed for past several ten years, and studies for efficiency improvement of a cooling cycle, a compressor, a heat exchanger and the like have reached the limit. Accordingly, recently studies with respect to thermal losses are mainly performed and many attempts to increase energy efficiency by strengthening heat insulation performance of refrigerators have been performed.

An insulation material such as existing polyurethane has about 20 mk/m·K. When the insulation material is used, a thickness of an outer wall of a refrigerator becomes greater in such a way that storage capacity of the refrigerator becomes reduced.

Accordingly, to solve these problems, it is necessary to use a vacuum insulation panel having excellent heat insulation performance.

To further improve heat insulation performance of a vacuum insulation panel, it is necessary to form a high vacuum in the vacuum insulation panel and then to maintain the high vacuum. When a vacuum pumping process in a vacuum chamber is performed to manufacture a vacuum insulation panel in a high vacuum, a long time may be consumed for forming a high vacuum in the vacuum insulation panel. Also, depending on types of core material, since a core material may be discharged as particles outside the vacuum insulation panel during the vacuum pumping process, an additional process may be required. Also, when a vacuum insulation panel is manufactured by vacuum-pumping in a vacuum chamber, since not only manufacturing costs thereof are high but also it is impossible to artificially control a shape of the vacuum insulation panel from the outside after the vacuum insulation panel is disposed in the vacuum chamber, it is difficult to manufacture a three-dimensional shaped vacuum insulation panel. Also, even when a vacuum insulation panel in a high vacuum is manufactured, it is difficult to maintain the high vacuum.

DISCLOSURE OF INVENTION

Technical Problem

It is an aspect of the present invention to provide a vacuum insulation panel having an improved structure for continuously maintaining a high vacuum by effectively removing gases and water, a method of manufacturing the vacuum insulation panel, and a refrigerator including the vacuum insulation panel.

It is another aspect of the present invention to provide a vacuum insulation panel having an improved structure for reducing a manufacturing time and manufacturing costs, a method of manufacturing the vacuum insulation panel, and a refrigerator including the insulation panel.

It is still another aspect of the present invention to provide a vacuum insulation panel capable of having various three-dimensional shapes, a method of manufacturing the vacuum insulation panel, and a refrigerator including the vacuum insulation panel.

It is yet another aspect of the present invention to provide a vacuum insulation panel having an improved structure for simplifying a manufacturing process irrelevant to types of core material, a method of manufacturing the vacuum insulation panel, and a refrigerator including the insulation panel.

Technical Solution

One aspect of the present invention provides a refrigerator including a vacuum insulation panel. The vacuum insulation panel includes a core material, a covering material disposed outside the core material to form an accommodation space in which the core material is accommodated and a first adsorbent disposed in the accommodation space to be activated at a temperature higher than room temperature and to remove at least one of gases and water present in the accommodation space.

The first adsorbent includes a metal material.

The first adsorbent includes at least one of zirconium (Zr), titanium (Ti), aluminum (Al), vanadium (V), barium (Ba), nickel (Ni), and ferrite (Fe).

The vacuum insulation panel further includes a second adsorbent disposed in the accommodation space to remove water present in the accommodation with the first adsorbent.

The second adsorbent includes at least one of calcium oxide (CaO), magnesium carbonate ($MgCO_3$), barium oxide (BaO), molecular sieve, magnesium oxide (MgO), calcium chloride ($CaCl_2$), activated carbon, silica gel, activated alumina, and zeolite.

The vacuum insulation panel further includes a porous cover which encloses the first adsorbent to prevent heat generated by the first activated adsorbent from being transferred to the core material.

A material of the cover includes at least one of organic fiber and inorganic fiber.

One aspect of the present invention provides a vacuum insulation panel including a core material, a covering material disposed outside the core material to form an accommodation space in which the core material is accommodated and an adsorbent disposed in the accommodation space to be activated at a temperature higher than room temperature by an electromagnetic wave generated outside the covering material and to remove at least one of gases and water present in the accommodation space.

The adsorbent is disposed in the accommodation space to be spaced apart from the covering material.

The adsorbent includes a metal material.

The covering material includes a first covering material that comprises a part through which the electromagnetic wave passes and a second covering material coupled with the first covering material to form the accommodation space.

The first covering material includes a melting layer disposed to face the accommodation space in a thickness direction of the vacuum insulation panel, an inflow-prevention layer disposed on the melting layer to prevent at least one of gases and water from flowing toward the core material and a protection layer disposed to face the melting layer with the inflow-prevention layer therebetween, The inflow-prevention layer includes at least one of silicon dioxide ($SiO_2$), alumina ($Al_2O_3$), ethylene vinyl alcohol (EVOH), polyvinyl alcohol (PVA), and polyketone.

One aspect of the present invention provides a vacuum insulation panel further including a shielding layer disposed in the accommodation space to be positioned between the core material and the melting layer.

One aspect of the present invention provides a vacuum insulation panel further including a path on which the electromagnetic wave moves toward the adsorbent. A part of the shielding layer positioned on the path is formed of a material that less absorbs the electromagnetic wave than the adsorbent.

Another part of the shielding layer positioned outside the path includes a metal material.

One aspect of the present invention provides a vacuum insulation panel further including a path on which the electromagnetic wave moves toward the adsorbent. The shielding layer is discontinuously disposed in a longitudinal direction of the vacuum insulation panel to be positioned outside the path.

One aspect of the present invention provides a vacuum insulation panel including a core material, a covering material disposed outside the core material to form an accommodation space in which the core material is accommodated and a first adsorbent disposed in the accommodation space to be spaced apart from the covering material and heated at a temperature higher than room temperature to remove at least one of gases and water present in the accommodation space.

The first adsorbent is activated at a temperature higher than room temperature by an electromagnetic wave generated outside the covering material.

At least one part of the covering material has a lower electromagnetic wave absorption rate than that of the first adsorbent.

One aspect of the present invention provides a vacuum insulation panel further including an electromagnetic wave movement path on which the electromagnetic wave moves toward the first adsorbent to be transferred to the first adsorbent. The covering material includes a first covering material that comprises a part through which the electromagnetic wave passes and a second covering material coupled with the first covering material to form the accommodation space.

The first covering material includes a first part that is positioned on the electromagnetic wave movement path and has a lower electromagnetic wave absorption rate than that of the first adsorbent and a second part positioned outside the electromagnetic wave movement path and connected to the first part.

The first adsorbent includes at least one of Zr, Ti, Al, V, Ba, Ni, and Fe.

One aspect of the present invention provides a vacuum insulation panel further including a second adsorbent disposed in the accommodation space to remove water present in the accommodation with the first adsorbent.

The second adsorbent includes at least one of CaO, $MgCO_3$, BaO, molecular sieve, MgO, $CaCl_2$, activated carbon, silica gel, activated alumina, and zeolite.

One aspect of the present invention provides a method of manufacturing a vacuum insulation panel, including inserting a core material and a first adsorbent activated at a temperature higher than room temperature to remove at least one of gases and water into a covering material, preliminarily depressurizing an inside of the covering material, sealing the covering material and secondarily depressurizing the inside of the covering material by activating the first adsorbent.

The first adsorbent is activated at a temperature higher than room temperature by a heating inducer positioned outside the covering material.

The heating inducer transfers an electromagnetic wave to the first adsorbent using a non-contact heating method.

A material having a smaller electromagnetic wave absorption amount than that of the first adsorbent is disposed on a path through which the heating inducer transfers the electromagnetic wave to the first adsorbent.

The first adsorbent includes a metal material.

One aspect of the present invention provides a method of manufacturing a vacuum insulation panel, further including inserting a second adsorbent that removes water with the first adsorbent into the covering material.

One aspect of the present invention provides a covering material including a first covering material and a second covering material coupled with the first covering to form an accommodation space therein. At least one of the first covering material and the second covering material includes a nonmetal deposition covering material.

At least one of the first covering material and the second covering material includes a melting layer that faces the accommodation space and at least one barrier layer that is stacked above the melting layer and comprises at least one base layer and at least one deposition layer.

At least one of an organic component, an inorganic component, and an organic/inorganic composite component is deposited on the at least one deposition layer.

The organic component includes at least one of poly lactic acid (PLA), poly-1-lactic acid (PLLA), polyetherimide (PEI), PVA, epoxy, and acrylics.

The inorganic component includes at least one of $Al_2O_3$ and silica ($SiO_2$).

The organic/inorganic composite component includes at least one of micro $Al_2O_3$ and micro $SiO_2$.

Advantageous Effects

At least one of gases and water present in a vacuum insulation panel may be effectively removed by using a metal adsorbent activated at a high temperature.

Since it is possible to activate an adsorbent disposed in a vacuum insulation panel using a non-contact heating method, the vacuum insulation panel may be prevented from being damaged during a process of applying heat to the adsorbent.

Since it is possible to activate an adsorbent disposed in a vacuum insulation panel using a heating inducer, heat may be applied to the adsorbent while the vacuum insulation panel is installed in a refrigerator.

Since a vacuum insulation panel is manufactured to allow at least one part of a covering material positioned on an electromagnetic wave movement path to have a lower electromagnetic wave absorption rate than that of an adsorbent, it is possible to effectively heat only the adsorbent without damaging the covering material using an electromagnetic wave inducer.

Since an adsorbent may be activated limitlessly in number, it is possible to continuously maintain a high vacuum of a vacuum insulation panel.

BRIEF DESCRIPTION OF DRAWINGS

FIG. 4 is a view schematically illustrating a process of forming a vacuum insulation panel to be in a high vacuum according to one embodiment of the present invention;

FIG. 7 is a view

FIG. 8b is a cross-sectional view illustrating the first covering material having a different stacking structure from the first covering material of FIG. 8a;

FIG. 8c is a cross-sectional view illustrating the first covering material having a different stacking structure from the first covering material of FIG. 8a;

FIG. 9 is an enlarged cross-sectional view illustrating part Q of the vacuum insulation panel of FIG. 6a;

FIG. 19 is a table in which a manufacturing time and a thermal conductivity coefficient k of the vacuum insulation panel according to the first embodiment of the present invention are compared with those of an existing vacuum insulation panel.

MODE FOR INVENTION

Hereinafter, exemplary embodiments of the present disclosure will be described in detail with reference to the attached drawings. Meanwhile, the terms "a front end", "a rear end", "above", "below", "a top end", "a bottom end" and the like used herein are defined based on the drawings and shapes and positions of components are not limited thereto.

Figure 1:
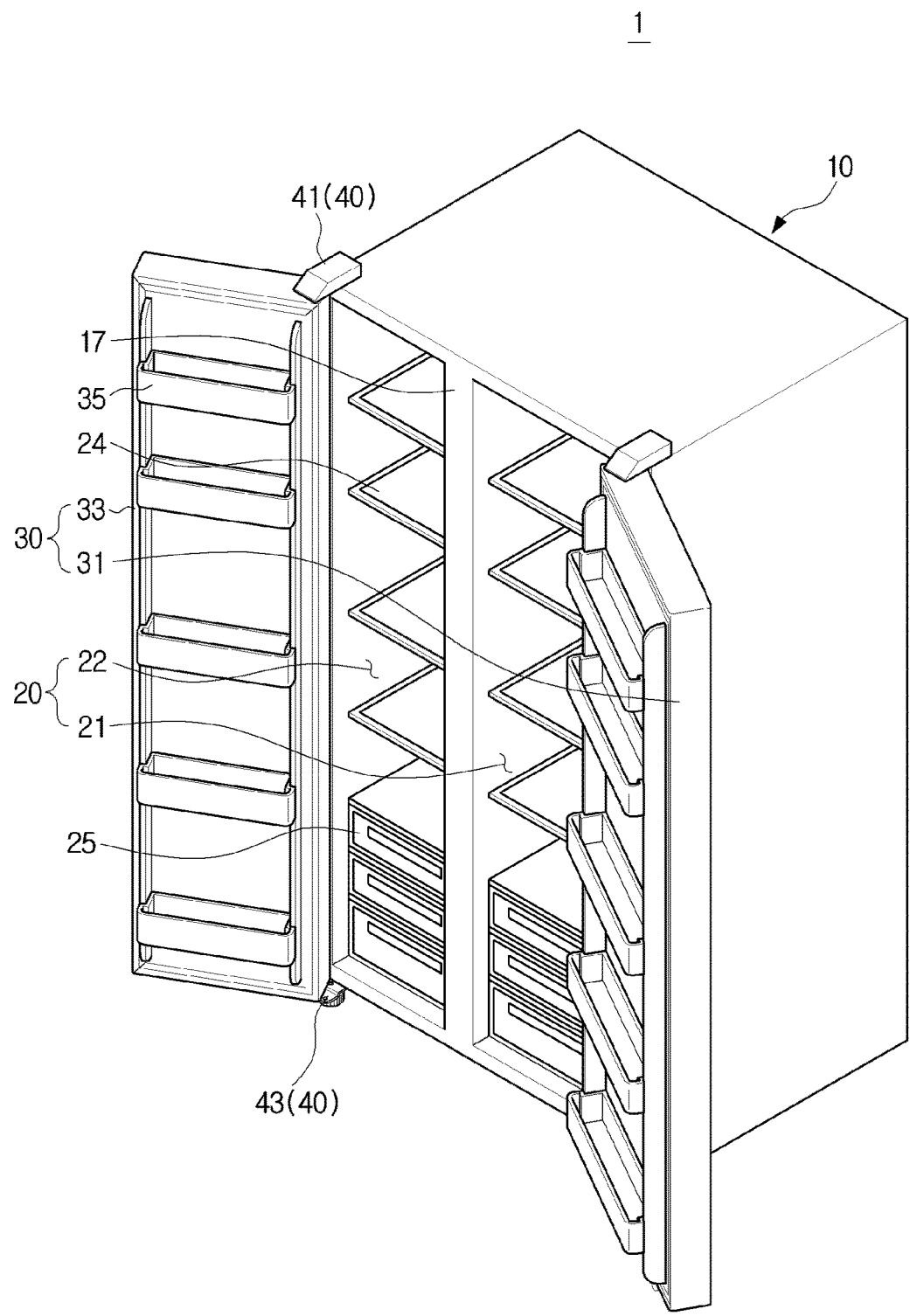
FIG. 1 is a perspective view illustrating an exterior of a refrigerator according to one embodiment of the present invention.
Figure 2:
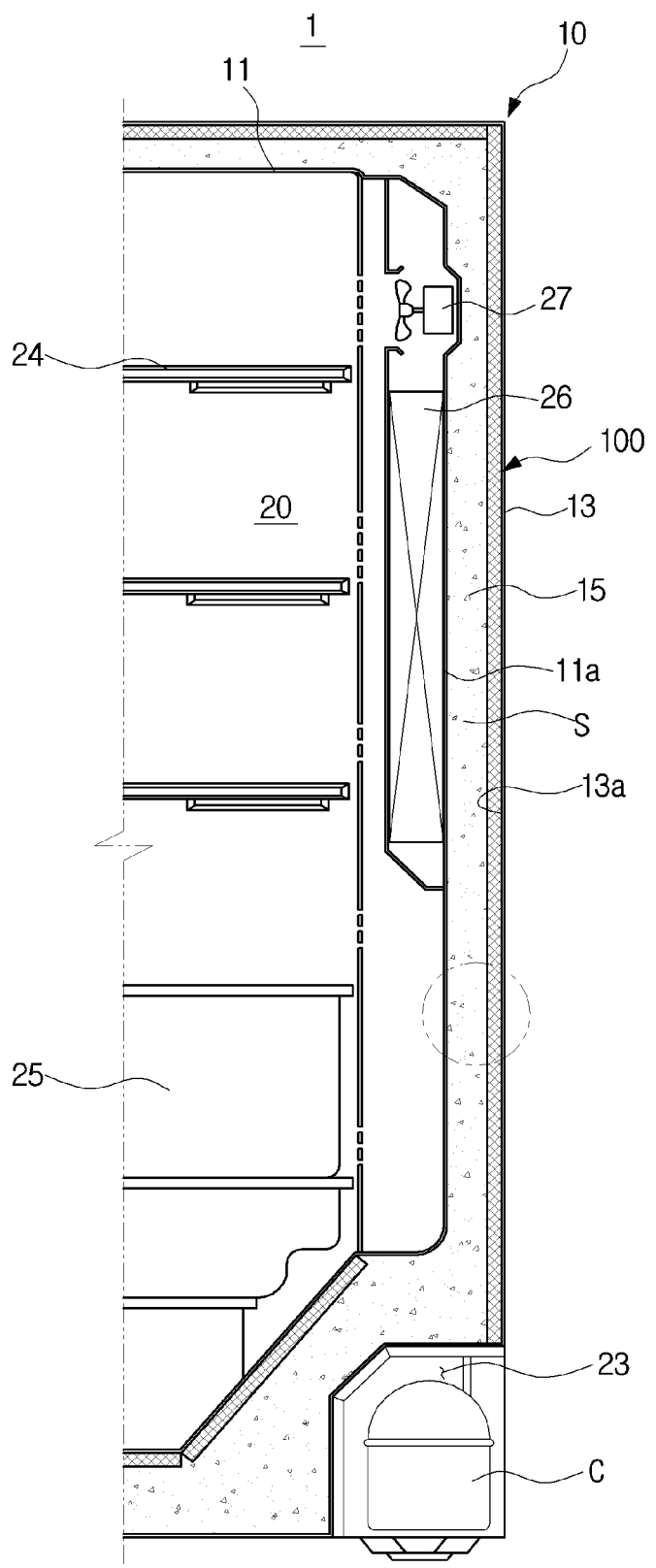
FIG. 2 is a cross-sectional view of the refrigerator according to one embodiment of the present invention.
Figure 3:
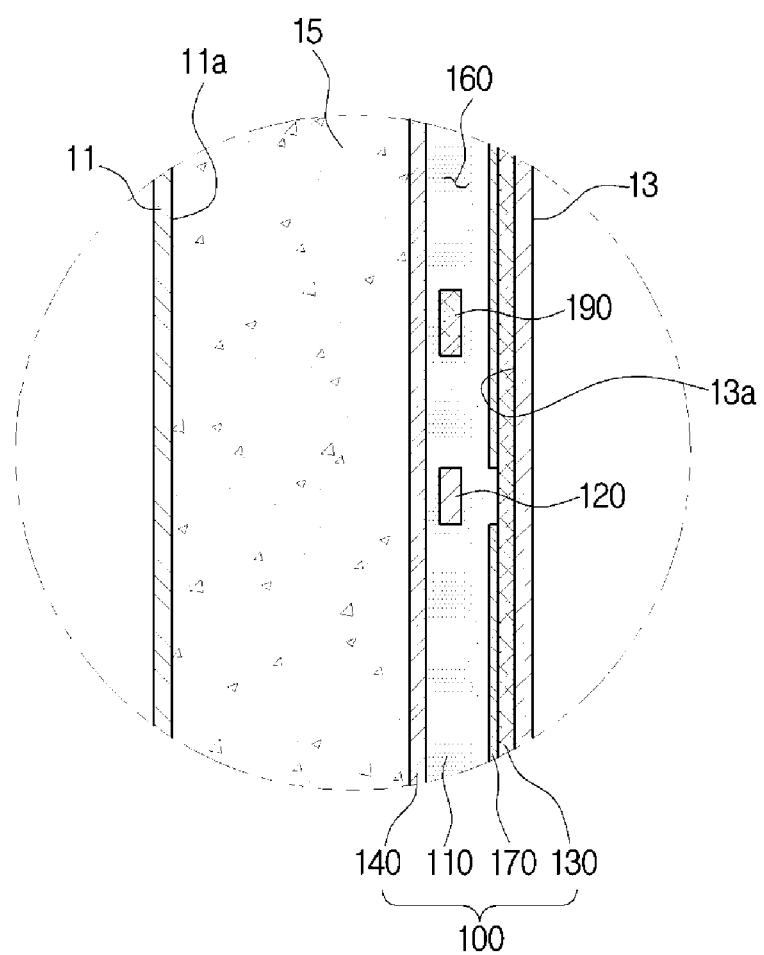
FIG. 3 is an enlarged cross-sectional view illustrating a part of FIG. 2.

FIG. 1 is a perspective view illustrating an exterior of a refrigerator according to one embodiment of the present invention, and FIG. 2 is a cross-sectional view of the refrigerator according to one embodiment of the present invention. FIG. 3 is an enlarged cross-sectional view illustrating a part of FIG. 2. FIGS. 1 to 3 illustrate on a case in which a vacuum insulation panel 100 according to a first embodiment is applied.

As shown in FIGS. 1 to 3, a refrigerator 1 may include a body 10 that forms an exterior and a storage compartment 20 provided in the body 10 to have an open front.

The body 10 may include an inner casing 11 that forms the storage compartment 20, an outer casing 13 that forms the exterior, and a cool air supplying device that supplies cool air to the storage compartment 20.

The cool air supplying device may be configured to include a compressor C, a condenser (not shown), an expansion valve (not shown), an evaporator 26, an air blower 27 and the like. A foam insulation material 15 may be formed between the inner casing 11 and the outer casing 13 of the body 10 to prevent a leakage of cool air in the storage compartment 20.

A machine compartment 23 in which the compressor C that compresses a refrigerant and the condenser which that condenses the compressed refrigerant are installed may be provided at a bottom of a rear of the body 10.

The storage compartment 20 is divided left and right by a partition wall 17 in such a way that a refrigeration compartment 21 may be provided on a right side of the body 10 and a fridge compartment 22 may be provided on a left side of the body 10.

The refrigerator 1 may further include a door 30 that opens and closes the storage compartment 20.

The refrigeration compartment 21 and the fridge compartment 22 may be opened and closed by a refrigeration compartment door 31 and a fridge compartment door 33 which are pivotably coupled with the body 10, and a plurality of door guards 35 may be provided at rear sides of the refrigeration compartment door 31 and the fridge compartment door 33 to store food and the like.

The storage compartment 20 may include a plurality of racks 24 provided to divide the storage compartment 20 into a plurality of rooms, and items such as food and the like are stacked on the racks 24.

Also, the storage compartment 20 may include a plurality of storage boxes 25 to be slidably inserted and withdrawn.

The refrigerator 1 may further include a hinge module 40 that includes an upper hinge 41 and a lower hinge 43 to allow the door 30 to be pivotably coupled with the body 10.

A foam space S is provided between the inner casing 11 that forms the storage compartment 20 and the outer casing 13 coupled with an outside of the inner casing 11 to form the exterior and is filled with the foam insulation material 15.

To reinforce heat insulation property of the foam insulation material 15, a vacuum insulation panel 100 may be provided with the foam insulation material 15.

The vacuum insulation panel 100 includes a core material 110 and covering materials 130 and 140. The covering materials 130 and 140 are very significant elements which prevent fine gases and water from penetrating a vacuum inside to maintain a life span of the vacuum insulation panel 100.

The covering materials 130 and 140 of the vacuum insulation panel 100 may include a first covering material 130 and a second covering material 140.

The first covering material 130 may be disposed outside the core material 110. The second covering material 140 may be coupled with the first covering material 130 to form an accommodation space 160 in which the core material 110 is accommodated. Also, the second covering material 140 may be coupled with the first covering material 130 to form the accommodation space 160 in which the core material 110 and an adsorbent 120 activated at a temperature higher than room temperature are accommodated.

The first covering material 130 and the second covering material 140 may be adhered to each other by welding or adhesion. When the first covering material 130 and the second covering material 140 are adhered to each other by welding or adhesion, since a gap or a path through which at least one of gas and water is movable is closed, penetration of at least one of gas and water into the core material 110 may become difficult. Accordingly, insulation and durability of the vacuum insulation panel 100 may be increased.

The first covering material 130 and the second covering material 140 may have the same or different heat transfer rates.

When the first covering material 130 and the second covering material 140 have different heat transfer rates, the first covering material 130 having a low heat transfer rate may be disposed outside the core material 110 to face an inner surface 13a of the outer casing 13. The second covering material 140 having a high heat transfer rate may be disposed outside the core material 110 to face an outer surface 11a of the inner casing 11 and may be coupled with the first covering material 130 to form the accommodation space 160 in which the core material 110 is accommodated.

The first covering material 130 may be adhered to the inner surface 13a of the outer casing 13. Since the first covering material 130 having a low heat transfer rate is adhered to the inner surface 13a of the outer casing 13, not only insulation performance may be improved but also outside water and gases may be prevented from flowing into the vacuum insulation panel 100. However, the first covering material 130 is not limited to being adhered to the inner surface 13a of the outer casing 13 and the second covering material 140 may be adhered to the inner surface 13a of the outer casing 13 instead of the first covering material 130.

FIG. 4 is a view schematically illustrating a process of forming a vacuum insulation panel to be in a high vacuum according to one embodiment of the present invention. Hereinafter, reference numerals (not shown) will be described with reference to FIGS. 1 to 3. Hereinafter, a heating inducer 200 may have a meaning including an electromagnetic wave inducer. Also, a path may have a meaning including an electromagnetic wave movement path 210. Also, the adsorbent 120 may have the same meaning of a first adsorbent 120. FIG. 4 illustrates a case in which the vacuum insulation panel 100 according to a first embodiment is applied.

As shown in FIG. 4, a vacuum of the vacuum insulation panel 100 may be continuously maintained by an interaction between the heating inducer 200 and the adsorbent 120. The heating inducer 200 may be positioned outside the vacuum insulation panel 100. The heating inducer 200 may selectively heat only the adsorbent 120 without damage of the covering materials 130 and 140.

In another aspect, the vacuum of the vacuum insulation panel 100 may be continuously maintained by a non-contact heating method. In detail, the adsorbent 120 positioned in the accommodation space 160 may be activated at a high temperature and may remove at least one of gases and water present in the accommodation space 160. Here, "high temperature" means a temperature higher than room temperature. Preferably, the temperature is 200° C. or more and 800° C. or less. The heating inducer 200 positioned outside the vacuum insulation panel 100 may be used to selectively heat only the adsorbent 120 positioned in the accommodation space 160. The heating inducer 200 may heat the adsorbent 120 using the non-contact heating method to activate the adsorbent 120 disposed in the accommodation space 160 at a high temperature without damage of the covering materials 130 and 140. That is, the heating inducer 200 is not in contact with the vacuum insulation panel 100, that is, separated from the vacuum insulation panel 100 and transfers a heating source to the adsorbent 120 to activate the adsorbent 120.

The heating source used to active the adsorbent 120 may include an electromagnetic wave. The heating source used to activate the adsorbent 120 in the embodiment may, preferably, be a high frequency of 200 KHz or more and 300 KHz or less but is not limited thereto and may be variously changed according to a type and amount of the adsorbent 120.

The non-contact heating method may include electric heating. The electric heating means converting electric energy into heat energy and heating an object. The electric heating may include, for example, resistance heating, dielectric heating, induction heating, infrared heating, electronic beam heating, laser heating and the like. The induction heating may be preferable as a method of heating the adsorbent 120 in the embodiment. Particularly, high-frequency induction heating using a high frequency of 200 KHz or more and 300 KHz or less is preferable. However, as described above, an electromagnetic wave type is not limited thereto and may be variously changed according to the type and amount of the adsorbent 120. Hereinafter, a case in which high-frequency induction heating is applied as a method of activating the adsorbent 120 will be mainly described.

The heating inducer 200 may include a coil 201 and ferrite 202. In the case of a general high-frequency induction heating method, an object to be heated is positioned in the coil 201. However, in the embodiment, since an object to be heated, that is, the adsorbent 120 is positioned in the vacuum insulation panel 100, it is difficult to selectively heat only the adsorbent 120. The ferrite 202 may be used as a method of overcoming the difficulty. A high-frequency current supplied to the coil 201 passes through the ferrite 202 and is transferred to the adsorbent 120 positioned in the vacuum insulation panel 100 to generate an eddy current in such a way that the adsorbent 120 may be heated by Joules heat generated at this time. That is, the ferrite 202 may function as a role of guiding the high-frequency current supplied to the coil 201 to allow the high-frequency current supplied to the coil 201 to be concentrated on the adsorbent 120. The ferrite 202, as shown in FIG. 4, may be positioned in the coil 201.

The vacuum insulation panel 100 may further include the electromagnetic wave movement path 210 through which an electromagnetic wave generated by the heating inducer 200 moves toward the adsorbent 120. The electromagnetic wave generated by the heating inducer 200 may move along the electromagnetic wave movement path 210 and may be transferred to the adsorbent 120. A material having a smaller heating source absorption amount than that of the adsorbent 120 may be disposed on the electromagnetic wave movement path 210. In other words, a material having a lower absorption rate of an electromagnetic wave than that of the adsorbent 120 may be disposed on the electromagnetic wave movement path 210. This is for selectively heating only the adsorbent 120 using the electromagnetic wave generated by the heating inducer 200.

The vacuum insulation panel 100 may further include the adsorbent 120 disposed in the accommodation space 160 to remove at least one of gases and water present in the accommodation space 160. The adsorbent 120 will be described below in detail.

The vacuum insulation panel 100 may further include a second adsorbent 190 disposed in the accommodation space 160 to remove water present in the accommodation space 160 with the adsorbent 120. When the adsorbent 120 and the second adsorbent 190 are used together, it is possible to more effectively remove the water present in the accommodation space 160. The second adsorbent 190 will be described below in detail.

Figure 5A:
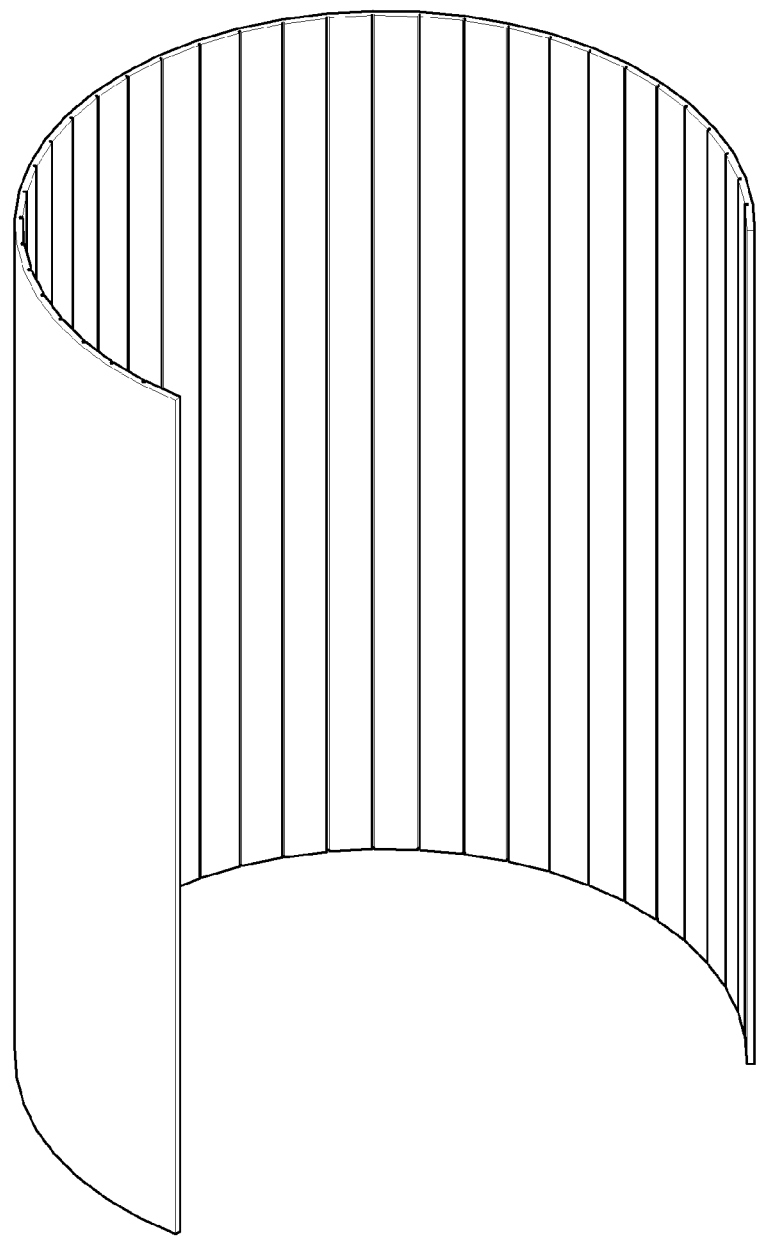
FIGS. 5a and 5b are views illustrating various shapes of the vacuum insulation panel according to one embodiment of the present invention.
Figure 5B:
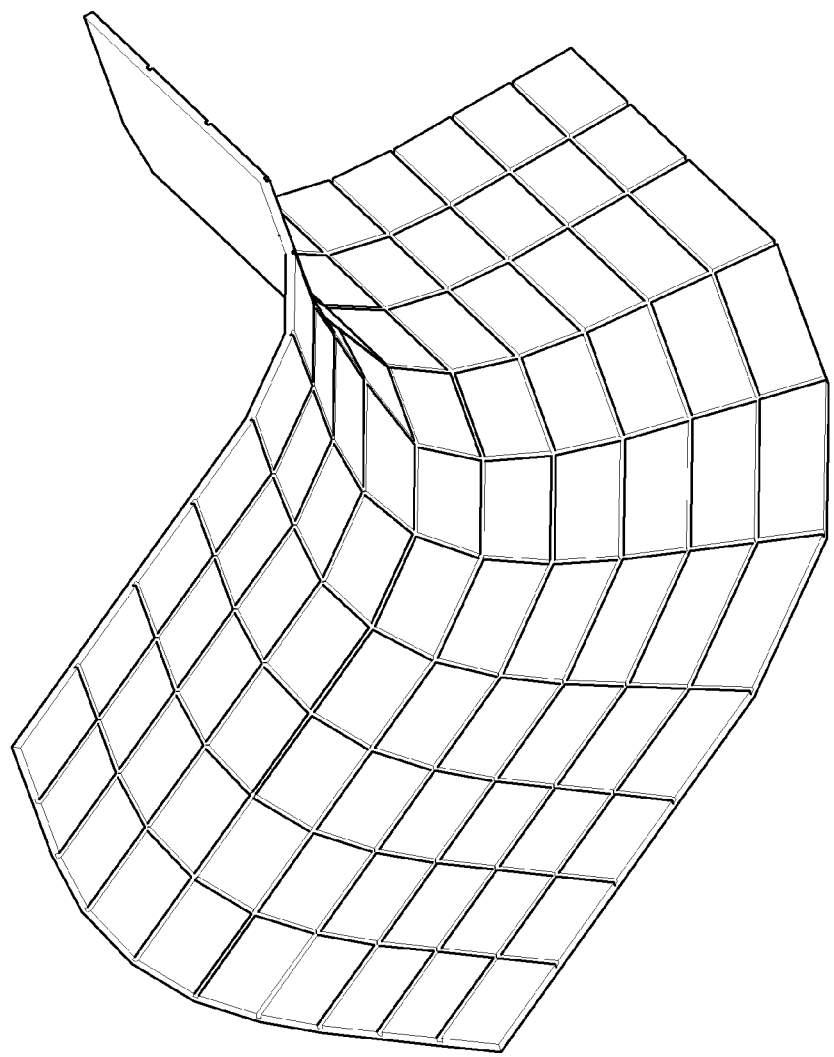

FIGS. 5a and 5b are views illustrating various shapes of the vacuum insulation panel according to one embodiment of the present invention. Hereinafter, reference numerals (not shown) will be described with reference to FIG. 4.

As shown in FIGS. 5a and 5b, the vacuum insulation panel 100 may have not only an existing standardized shape but also various three-dimensional shapes. Since it is necessary to previously describe a process of manufacturing the vacuum insulation panel 100 to describe a method of embodying the vacuum insulation panel 100 that has various three-dimensional shapes, hereinafter, the process of manufacturing the vacuum insulation panel will be described first and then the process of embodying the vacuum insulation panel will be described.

The process of manufacturing the vacuum insulation panel may include providing the covering materials 130 and 140 in an envelope shape (S1), inserting the core material 110 and the adsorbent 120 into the covering materials 130 and 140 (S2), preliminarily depressurizing insides of the covering materials 130 and 140 (S3), sealing the covering materials 130 and 140 (S4), and secondarily depressurizing the insides of the covering materials 130 and 140 by activating the adsorbent 120 (S5). The adsorbent 120 may be activated at a high temperature and may remove at least one of gases and water present in the covering materials 130 and 140. The second adsorbent 190 may be inserted with the core material 110 and the adsorbent 120 into the covering materials 130 and 140.

In a first depressurization process, the insides of the covering materials 130 and 140 are formed in a low vacuum. In a second depressurization process, the insides of the covering materials 130 and 140 are formed in a high vacuum. In detail, the insides of the covering materials 130 and 140 having gone through the first depressurization process may have a vacuum level of 0.1 torr or more and 10 torr or less. The insides of the covering materials 130 and 140 having gone through the second depressurization process may have a vacuum level of 0.1 torr or less. As an example, the first depressurization process may be performed in a vacuum chamber (not shown) and the second depressurization process may be performed by the heating inducer 200. Although a high vacuum of the vacuum insulation panel 100 may be provided by only working in the vacuum chamber, there is a problem of consuming a longer time for providing the high vacuum of the vacuum insulation panel 100 than that of a case of providing the high vacuum of the vacuum insulation panel 100 through the first depressurization process in the vacuum chamber and the second depressurization process using the heating inducer.

The vacuum insulation panel manufacturing process may further include shaping the vacuum insulation panel 100 to have various three-dimensional shapes (S6). The process of shaping the vacuum insulation panel 100 may be performed after preliminarily depressurizing of the insides of the covering materials 130 and 140 and before secondarily depressurizing thereof. Jigs having various shapes may be used for forming the vacuum insulation panel 100 that has various three-dimensional shapes. When the vacuum insulation panel 100 is shaped after the vacuum insulation panel 100 is completed, that is, the insides of the covering materials 130 and 140 are formed in a high vacuum, the covering materials 130 and 140 may be easily damaged. Accordingly, it is difficult to shape the vacuum insulation panel 100 that has various three-dimensional shapes after the vacuum insulation panel 100 is completed.

When the process of shaping the vacuum insulation panel 100 is finished, the adsorbent 120 is activated at a high temperature to form the insides of the covering materials 130 and 140 in a high vacuum. The activation of the adsorbent 120 may be performed limitlessly in number by the heating inducer 200.

Figure 6A:
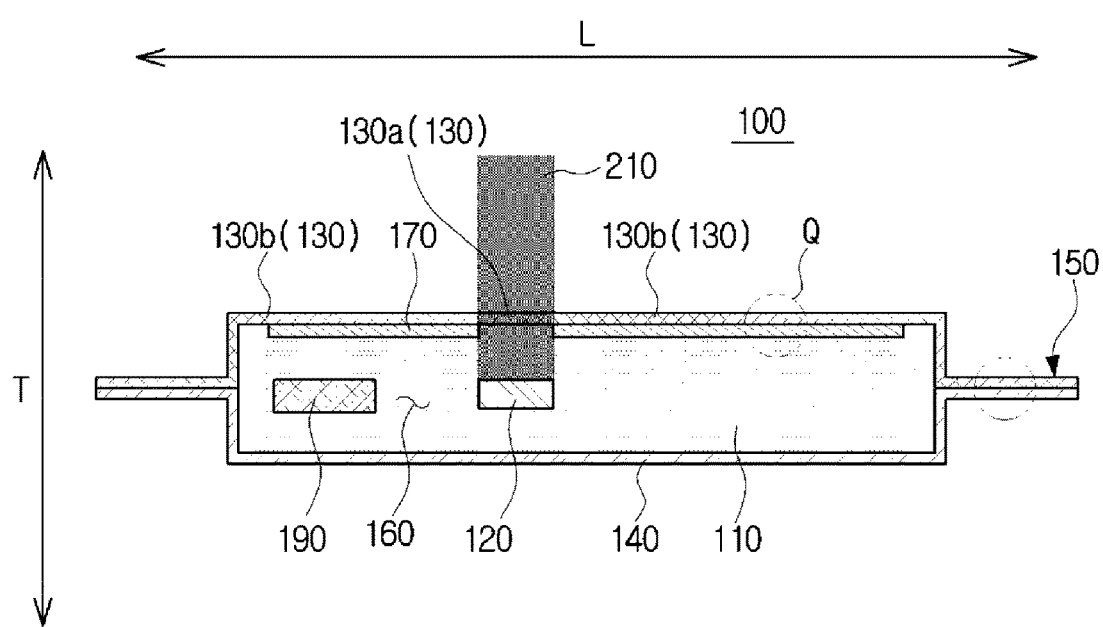
FIG. 6a is a cross-sectional view of the vacuum insulation panel according to the first embodiment of the present invention.
Figure 6B:
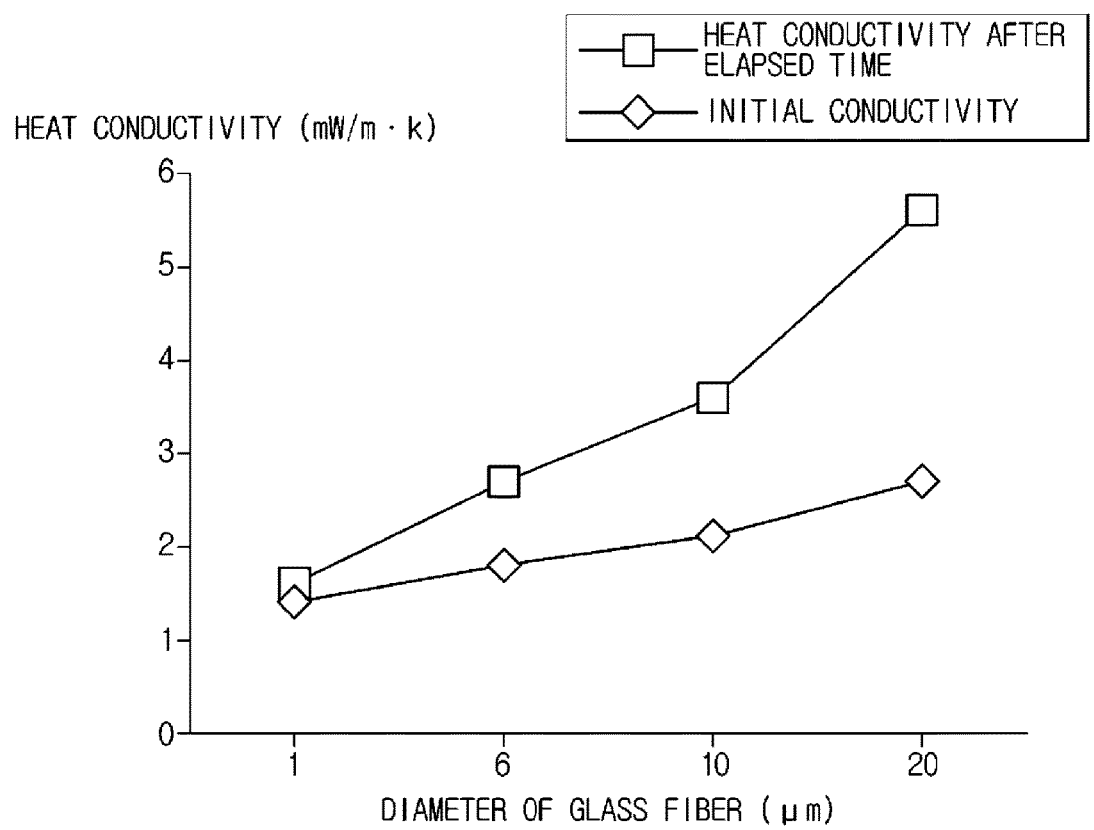
FIG. 6b is a graph illustrating a relationship between a diameter and thermal conductivity of glass fiber in the vacuum insulation panel according to the first embodiment of the present invention.
Figure 6C:
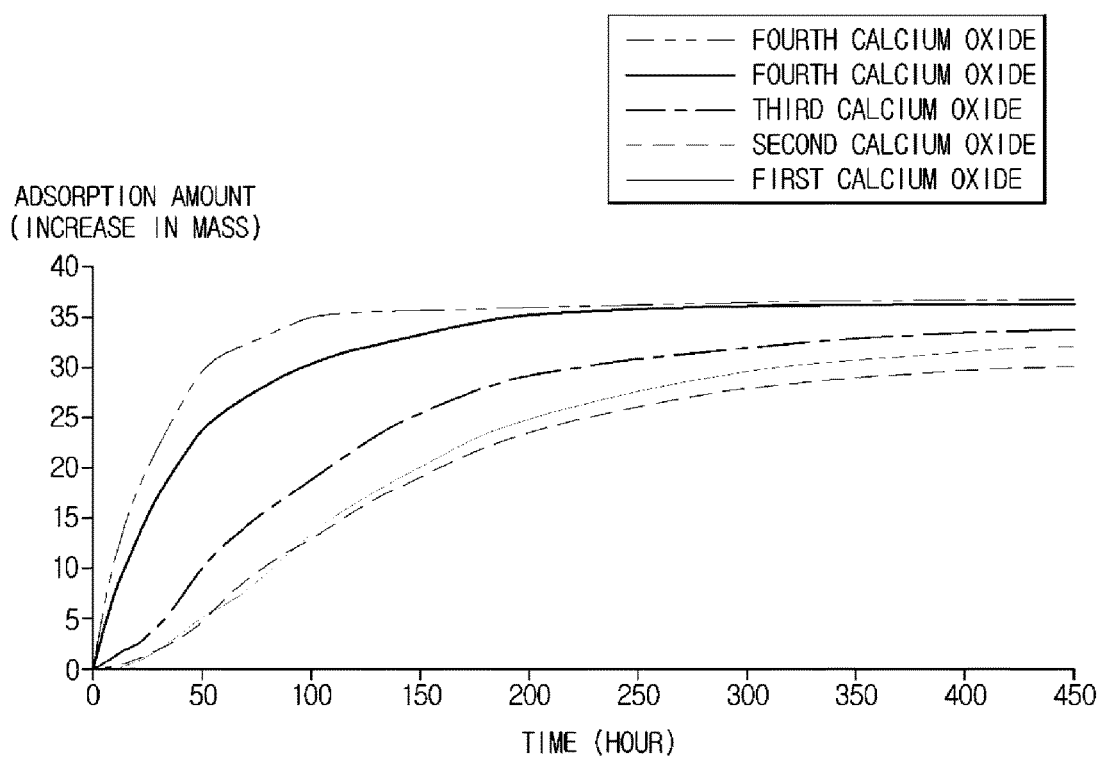
FIG. 6c is a graph illustrating a target material adsorption amount according to a second adsorbent having various specific surface areas according to elapsed time in the vacuum insulation panel according to the first embodiment of the present invention.
Figure 8A:
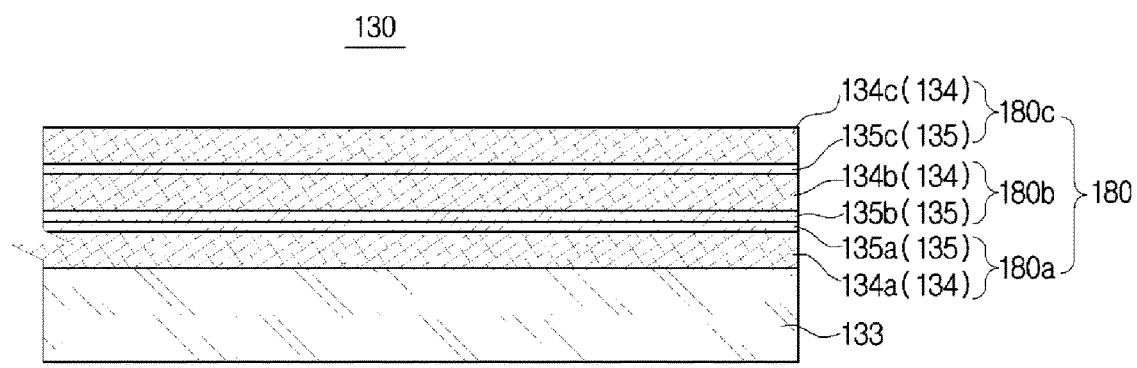
FIG. 8a is an enlarged cross-sectional view illustrating the first covering material of the vacuum insulation panel according to the first embodiment of the present invention.
Figure 8B:
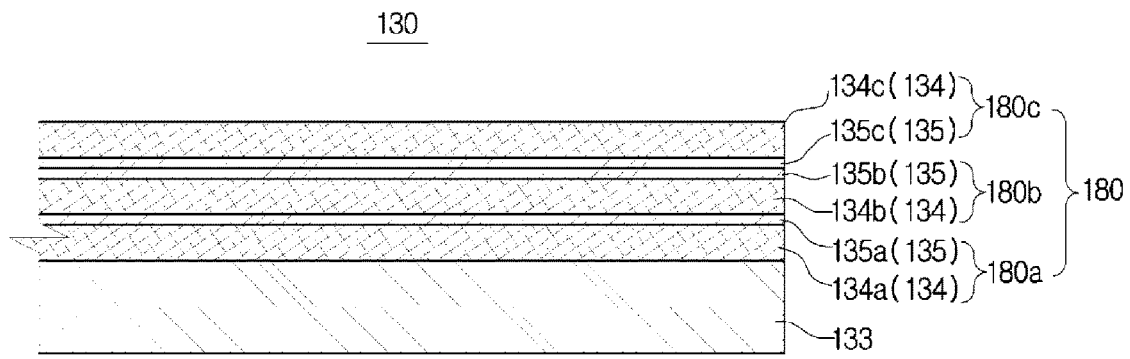
Figure 8C:
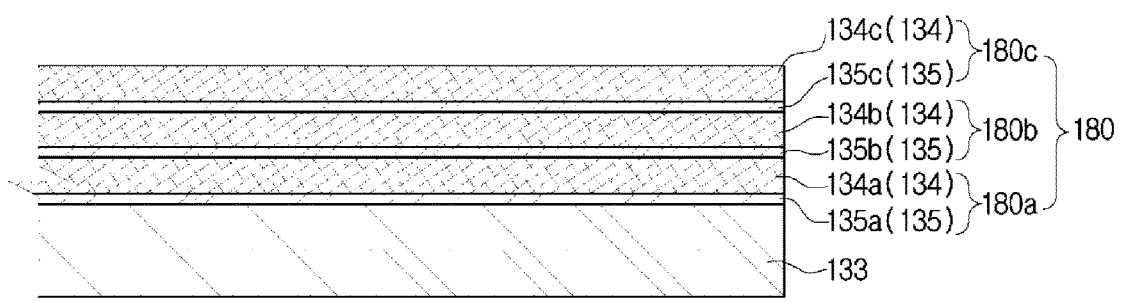
Figure 9:
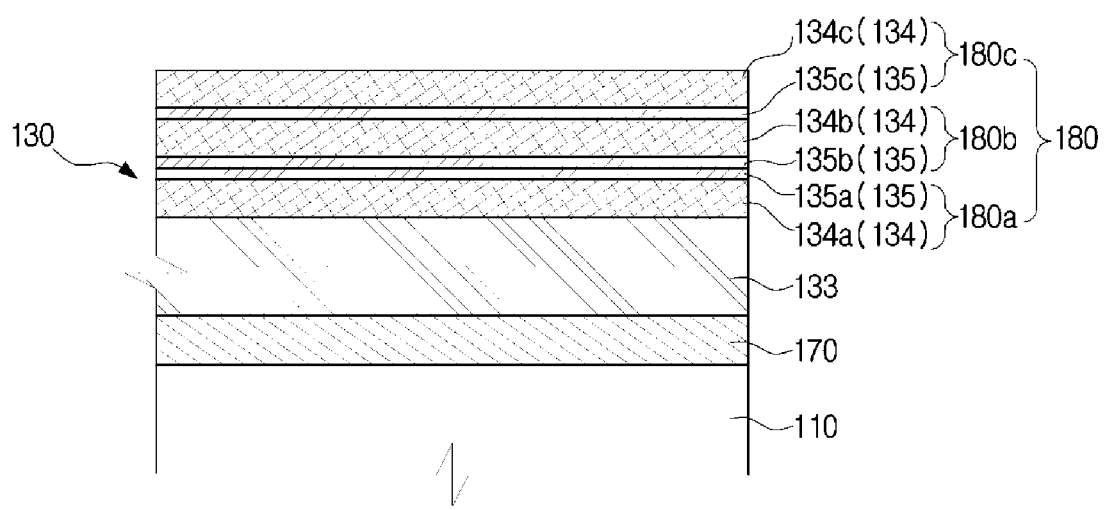
Figure 10:
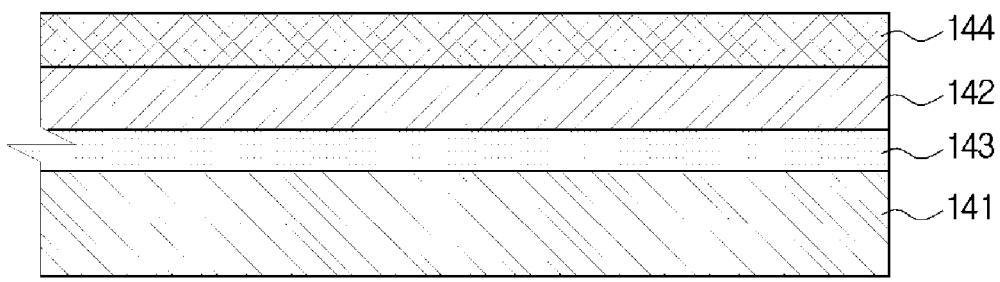
FIG. 10 is an enlarged cross-sectional view illustrating the second covering material of the vacuum insulation panel according to the first embodiment of the present invention.
Figure 11:
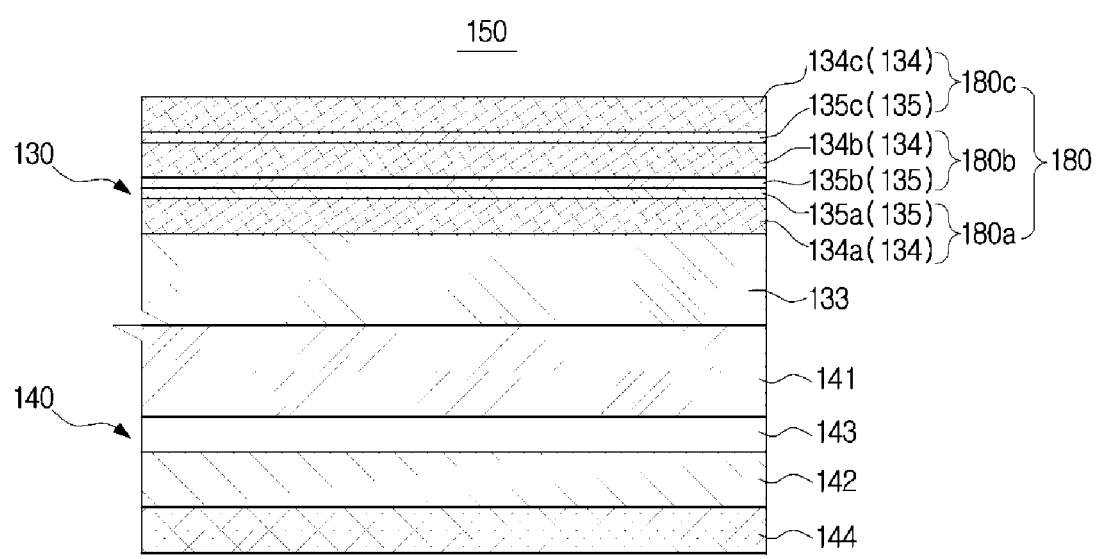
FIG. 11 is an enlarged cross-sectional view illustrating an extension portion of the vacuum insulation panel according to the first embodiment of the present invention.

FIG. 6a is a cross-sectional view of the vacuum insulation panel according to the first embodiment of the present invention, and FIG. 6b is a graph illustrating a relationship between a diameter and thermal conductivity of glass fiber in the vacuum insulation panel according to the first embodiment of the present invention. FIG. 6c is a graph illustrating a target material adsorption amount according to a second adsorbent having various specific surface areas according to elapsed time in the vacuum insulation panel according to the first embodiment of the present invention, and FIG. 7 is a view illustrating adsorbents applicable to the vacuum insulation panel according to the first embodiment of the present invention. FIG. 8a is an enlarged cross-sectional view illustrating the first covering material of the vacuum insulation panel according to the first embodiment of the present invention, and FIG. 8b is a cross-sectional view illustrating the first covering material having a different stacking structure from the first covering material of FIG. 8a. FIG. 8c is a cross-sectional view illustrating the first covering material having a different stacking structure from the first covering material of FIG. 8a, and FIG. 9 is an enlarged cross-sectional view illustrating part Q of the vacuum insulation panel of FIG. 6a. FIG. 10 is an enlarged cross-sectional view illustrating the second covering material of the vacuum insulation panel according to the first embodiment of the present invention, and FIG. 11 is an enlarged cross-sectional view illustrating an extension portion of the vacuum insulation panel according to the first embodiment of the present invention. Hereinafter, reference numerals (not shown) will be described with reference to FIG. 4. Also, in describing with reference to FIGS. 8b and 8c, a repeated description of FIG. 8a will be omitted. In FIGS. 6a to 11, a case in which the first covering material 130 and the second covering material 140 have different heat transfer rates will be mainly described. In detail, a case in which the first covering material 130 is a covering material which gases and water relatively easily penetrate and the second covering material 140 is a covering material which gases and water relatively cannot easily penetrate will be described as an example.

The first covering material 130 may include a nonmetal-deposition covering material. In detail, the nonmetal-deposition covering material may include at least one of an inorganic component, an organic component, and an organic/inorganic composite component. Although described below, at least one of the inorganic component, the organic component, and the organic/inorganic composite component may be embodied as a deposition layer 135 of the first covering material 130. The second covering material 140 may include an aluminum foil covering material, a metal-deposition covering material, a nonmetal-deposition covering material, and the like. Hereinafter, for convenience of description, the first covering material 130 refers to a nonmetal-deposition covering material and the second covering material 140 refers to an aluminum foil covering material. Although the aluminum foil covering material has low water and gas penetration but a heat bridge phenomenon (a phenomenon in which heat flows through an edge of a vacuum insulation panel) occurs therein and insulation performance may decrease. On the other hand, the nonmetal-deposition covering material may prevent the heat bridge phenomenon but may have decreased durability due to high water and gas penetration. Hereinafter, the vacuum insulation panel 100 according to the first embodiment of the present invention, which prevents the heat bridge phenomenon and simultaneously has improved durability by overcoming limitations of the above-described nonmetal-deposition covering material and aluminum foil covering material will be described.

As shown in FIGS. 6a to 11, the vacuum insulation panel 100 may include the core material 110, the first covering material 130, and the second covering material 140.

The core material 110 may include glass fiber having excellent heat insulation performance. High heat insulation effect may be obtained by forming a structure formed of stacking panels weaved using glass fiber as thin as possible. In detail, since it is possible to minimize an influence of radiation as a pore size among glass fiber becomes smaller, high heat insulation effect may be expected.

The diameter of glass fiber may be 2 μm or more and 10 μm or less.

In the graph shown in FIG. 6b, an x-axis indicates a diameter of glass fiber and a y-axis indicates thermal conductivity. A measure of the diameter of glass fiber is μm, and a measure of the thermal conductivity is mW/m·K.

When the diameter of glass fiber is 1 μm, initial thermal conductivity is 1.4 mW/m·K and is 1.6 mW/m·K after a certain time passed. The thermal conductivity increases by 0.2 mW/m·K according to elapsed time. When the diameter of glass fiber is 6 μm, initial thermal conductivity is 1.86 mW/m·K and is 2.76 mW/m·K after a certain time passed. The thermal conductivity increases by 0.96 mW/m·K according to elapsed time. When the diameter of glass fiber is 10 μm, initial thermal conductivity is 2.1 mW/m·K and is 3.6 mW/m·K after a certain time passed. The thermal conductivity increases by 1.5 mW/m·K according to elapsed time. When the diameter of glass fiber is 20 μm, initial thermal conductivity is 2.7 mW/m·K and is 5.6 mW/m·K after a certain time passed. The thermal conductivity increases by 2.9 mW/m·K according to elapsed time.

It may be checked through the graph in FIG. 6b that the greater diameter of glass fiber, the higher thermal conductivity. This is because heat transference may be smoothly performed through glass fiber as the diameter of glass fiber increases. Accordingly, when considering only an aspect of thermal conductivity, a smaller diameter of glass fiber is better. However, when a diameter of glass fiber is excessively small, it is difficult to provide a vacuum in the vacuum insulation panel 100. In detail, when a diameter of glass fiber is excessively small, the glass fiber may be excessively densely arranged in the accommodation space 160. The glass fiber densely arranged in the accommodation space 160 may interfere in adsorption of the first adsorbent 120 and the second adsorbent 190 with respect to a target material.

Accordingly, a diameter of glass fiber may be 2 μm or more and 10 μm or less.

However, the diameter of the glass fiber is not limited the above range and may be variously changed due to a reason in design of the vacuum insulation panel 100 and the like. The core material 110 may further include fumed silica.

In conclusion, the core material 110 may include at least one of glass fiber and fumed silica.

The first covering material 130 may be disposed on one surface of the core material 110, and the second covering material 140 may be disposed on another surface of the core material 110 to form the accommodation space 160 in which the core material 110 is accommodated by being coupled with the first covering material 130.

Types of the first covering material 130 and the second covering material 140 may be different from each other.

Also, the first covering material 130 and the second covering material 140 may be formed of different materials.

Also, the first covering material 130 and the second covering material 140 may have different thicknesses.

Also, the first covering material 130 and the second covering material 140 may have different stacking structures. In detail, the first covering material 130 and the second covering material 140 may have different layers forming them. Even when the first covering material 130 and the second covering material 140 may have the same layers forming them, arrangements of the layers may be different.

Also, the first covering material 130 and the second covering material 140 may have different stacking numbers. Even when the types of the first covering material 130 and the second covering material 140 are identical to each other, the number of the layers of the first covering material 130 and the number of the layers of the second covering material 140 may be different from each other.

The first covering material 130 and the second covering material 140 may be coupled with each other to form an extension portion 150 that extends outward from the accommodation space 160. The extension portion 150 may be formed to extend outward from both sides of the core material 110. The first covering material 130 and the second covering material 140 may be adhered to each other at the extension portion 150 to maintain the accommodation space 160 in which the core material 110 is accommodated, in a vacuum.

The vacuum insulation panel 100 may further include a shielding layer 170.

The shielding layer 170 may be disposed between at least one of the first covering material 130 and the second covering material 140 and the core material 110 to prevent at least one of gases and water from penetrating the accommodation space 160.

Preferably, the shielding layer 170 may be installed on the inner surfaces of the covering materials 130 and 140 which at least one of gases and water relatively easily penetrate. That is, the shielding layer 170 may be disposed between the core material 110 and the first covering material 130 to prevent at least one of gases and water from passing through the first covering material 130 and penetrating the accommodation space 160.

The shielding layer 170 may be accommodated with the core material 110 in the accommodation space 160 and may be adhered to at least one of the first covering material 130 and the second covering material 140 to be integrated with the at least one of the first covering material 130 and the second covering material 140. Preferably, the shielding layer 170 may be adhered to the first covering material 130 to be integrated with the first covering material 130.

The shielding layer 170 may include at least one of metal foil, an inorganic deposition film, and a polymer resin.

The first covering material 130 may be disposed to face the heating inducer 200. The first covering material 130 may be disposed to be spaced apart from the heating inducer 200. At least one part of the first covering material 130 may be positioned on the electromagnetic wave movement path 210. Describing in another aspect, the first covering material 130 may include a part through which a heating source, that is, electromagnetic waves pass.

The first covering material 130 may include a melting layer 133 and at least one barrier layer 180.

The melting layer 133 may face the accommodation space 160 toward the inside of the core material 110. The melting layer 133 may include at least one of linear low-density polyethylene (LLDPE), low density polyethylene (LDPE), high density polyethylene (HDPE), and casting polypropylene (CPP).

The melting layer 133 may be formed in a film shape.

The at least one barrier layer 180 may be stacked above the melting layer 133 and may include a base layer 134 and the deposition layer 135.

The base layer 134 may include at least one of polyethylene phthalate (PET), vacuum metalized polyethylene phthalate (VMPET), ethylene vinyl alcohol (EVOH), and nylon.

The deposition layer 135 may be provided on the base layer 134 to prevent at least one of gases and water that flow toward the core material 110.

The deposition layer 135 may be formed by physical deposition including evaporation, sputtering, and aerosol deposition or chemical deposition including chemical vapor deposition (CVD).

The deposition layer 135 may include at least one of an organic component, an inorganic component, and an organic/inorganic composite component. That is, at least one of the organic component, inorganic component, and organic/inorganic composite component may be deposited on the deposition layer 135.

The organic component may include at least one of poly lactic acid (PLA), poly-1-lactic acid (PLLA), polyetherimide (PEI), polyvinyl alcohol (PVA), epoxy, and acrylics. A thickness of the deposition layer 135 formed of the organic component may be 3 μm or less.

The inorganic component may include various types of metal oxide. For example, the inorganic component may include at least one of alumina ($Al_2O_3$) and silica ($SiO_2$). A thickness of the deposition layer 135 formed of the inorganic component may be 100 nm or less.

The organic/inorganic composite component may be strengthened in shielding performance and may be obtained by scattering inorganic particles in polymer. For example, the inorganic particles may include at least one of $Al_2O_3$ and $SiO_2$. A thickness of the deposition layer 135 formed of the organic/inorganic component may be 3 μm or less.

Although a type of metal, aluminum (Al) may be included in a part of the deposition layer 135. In detail, Al may be included in a part of the deposition layer 135 which is not positioned on the electromagnetic wave movement path 210, that is, positioned outside the electromagnetic wave movement path 210. Here, a thickness of the deposition layer 135 including Al may be 10 nm or more and 300 nm or less.

As shown in FIG. 8a, the at least one barrier layer 180 may include a first barrier layer 180a, a second barrier layer 180b, and a third barrier layer 180c. In this case, the first barrier layer 180a positioned above the melting layer 133 to face the melting layer 133 may include a first base layer 134a that encloses the melting layer 133 and a first deposition layer 135a disposed above the first base layer 134a.

The second barrier layer 180b positioned above the first barrier layer 180a to face the first barrier layer 180a may include a second base layer 134b positioned above the first deposition layer 135a and a second deposition layer 135b positioned between the first deposition layer 135a and the second base layer 134b. That is, the second barrier layer 180b may be stacked above the first barrier layer 180a to allow the first deposition layer 135a and the second deposition layer 135b to face each other.

The third barrier layer 180c positioned above the second barrier layer 180b may include a third deposition layer 135c provided above the second base layer 134b and a third base layer 134c positioned above the third deposition layer 135c.

A reason of stacking the second barrier layer 180b above the first barrier layer 180a to allow the first deposition layer 135a to face the second deposition layer 135b is to prevent a crack from being generated at the first deposition layer 135a. In detail, when the first deposition layer 135a is disposed on the melting layer 133, cracks may easily occur at the first deposition layer 135a due to a property of the melting layer 133. When cracks occur at the first deposition layer 135a, at least one of gases and water may flow into the vacuum insulation panel 100 through the cracks. Accordingly, heat insulation performance of the vacuum insulation panel 100 may be decreased. Accordingly, it is preferable that the second barrier layer 180b is stacked above the first barrier layer 180a to allow the first deposition layer 135a and the second deposition layer 135b to face each other.

The first deposition layer 135a, the second deposition layer 135b, and the third deposition layer 135c may include at least one of an organic component, an inorganic component, and an organic/inorganic component.

At least one combination of an organic component, an inorganic component, and an organic/inorganic component which forms each of the first deposition layer 135a, the second deposition layer 135b, and the third deposition layer 135c is variable.

For example, the first deposition layer 135a, the second deposition layer 135b, and the third deposition layer 135c may be formed of an inorganic component, an organic component, and an inorganic component, respectively.

As another example, the first deposition layer 135a, the second deposition layer 135b, and the third deposition layer 135c may be formed of an inorganic component, an inorganic component, and an organic component, respectively.

As another example, the first deposition layer 135a, the second deposition layer 135b, and the third deposition layer 135c may be formed of an inorganic component, an organic component, and an organic component, respectively.

As another example, all the first deposition layer 135a, the second deposition layer 135b, and the third deposition layer 135c may be formed of organic components.

As another example, the first deposition layer 135a, the second deposition layer 135b, and the third deposition layer 135c may be formed of an organic component, an inorganic component, and an organic component, respectively.

As another example, the first deposition layer 135a, the second deposition layer 135b, and the third deposition layer 135c may be formed of an inorganic component, an organic/inorganic composite component, and an organic component, respectively.

As another example, the first deposition layer 135a, the second deposition layer 135b, and the third deposition layer 135c may be formed of an inorganic component, an organic component, and an organic/inorganic composite component, respectively.

At least one combination of an organic component, an inorganic component, and an organic/inorganic composite component which forms each of the first deposition layer 135a, the second deposition layer 135b, and the third deposition layer 135c is not limited thereto and variously changeable.

The at least one barrier layer 180 is not limited to the first barrier layer 180a, the second barrier layer 180b, and the third barrier layer 180c.

The shielding layer 170 may face the melting layer 133 of the first covering material 130 and may be adhered to the melting layer 133.

The first covering material 130 may further include a protection layer (not shown). The protection layer may be disposed above the at least one barrier layer 180. In detail, the protection layer performs a function of protecting the vacuum insulation panel 100 from an external shock by absorbing or dispersing the external shock. Accordingly, the protection layer may be formed of a material having excellent shock resistance. The protection layer may be disposed at the outermost part of the first covering material 130. The protection layer may include at least one of PET, oriented polypropylene (OPP), nylon, and oriented nylon.

As shown in FIG. 8b, the at least one barrier layer 180 may include the first barrier layer 180a, the second barrier layer 180b, and the third barrier layer 180c. In this case, the first barrier layer 180a positioned above the melting layer 133 to face the melting layer 133 may include a first base layer 134a that encloses the melting layer 133 and a first deposition layer 135a disposed above the first base layer 134a.

The second barrier layer 180b positioned above the first barrier layer 180a to face the first barrier layer 180a may include a second deposition layer 135b positioned above the first deposition layer 135a and a second base layer 134b positioned between the first deposition layer 135a and the second deposition layer 135b. That is, the second barrier layer 180b may be stacked above the first barrier layer 180a to allow the first deposition layer 135a and the second base layer 134b to face each other.

The third barrier layer 180c positioned above the second barrier layer 180b may include a third deposition layer 135c provided above the second deposition layer 135b and a third base layer 134c positioned above the third deposition layer 135c.

As shown in FIG. 8c, the at least one barrier layer 180 may include the first barrier layer 180a, the second barrier layer 180b, and the third barrier layer 180c. In this case, the first barrier layer 180a positioned above the melting layer 133 to face the melting layer 133 may include a first deposition layer 135a that encloses the melting layer 133 and a first base layer 134a disposed above the first deposition layer 135a.

The second barrier layer 180b positioned above the first barrier layer 180a to face the first barrier layer 180a may include a second base layer 134b positioned above the first base layer 134a and a second deposition layer 135b positioned between the first base layer 134a and the second base layer 134b. That is, the second barrier layer 180b may be stacked above the first barrier layer 180a to allow the first base layer 134a and the second deposition layer 135b to face each other.

The third barrier layer 180c positioned above the second barrier layer 180b may include a third deposition layer 135c provided above the second base layer 134b and a third base layer 134c positioned above the third deposition layer 135c.

The second covering material 140 may enclose a bottom of the core material 110.

The second covering material 140 may include a sealing layer 141, an internal layer 142, a preventing layer 143, and a cover layer 144.

The sealing layer 141 is adhered to a surface of the core material 110 to enclose the core material 110 and the shielding layer 170 with the melting layer 133 of the first covering material 130. The sealing layer 141 may include at least one of LLDPE, LDPE, HDPE, and CPP.

The sealing layer 141 may be formed in a film shape.

The internal layer 142 may be positioned above the sealing layer 141. The internal layer 142 may include at least one of PET, VMPET, EVOH, and nylon.

The preventing layer 143 may be provided between the sealing layer 141 and the internal layer 142 and may include Al.

The cover layer 144 performs a function of protecting the surface or the core material 110 in the vacuum insulation panel 100 from an external shock by absorbing and dispersing the external shock. Accordingly, the cover layer 144 may be formed of a material having excellent shock resistance.

The cover layer 144 may include at least one of PET, OPP, nylon, and oriented nylon.

The vacuum insulation panel 100 may further include the adsorbent 120.

The adsorbent 120 is for maintaining an excellent vacuum in the vacuum insulation panel 100 by adsorbing at least one of gases and water that is present in the vacuum insulation panel 100 or flows from the outside of the vacuum insulation panel 100.

The adsorbent 120 may be disposed in the accommodation space 160. In detail, the adsorbent 120 may be disposed in the accommodation space 160 to be spaced apart from the covering materials 130 and 140. This is to prevent the covering materials 130 and 140 from being damaged by heat generated in a process in which the adsorbent 120 is activated.

The adsorbent 120 may be disposed in or inserted into the core material 110.

The adsorbent 120 may be activated at a high temperature. The adsorbent 120 may be activated at a high temperature by the heating inducer 200 and may remove at least one of gases and water that is present in the accommodation space 160 or penetrates the accommodation space 160 from the outside.

The adsorbent 120 may be selectively activated at a high temperature. That is, the adsorbent 120 does not always exist in an activated state and may be selectively activated at a high temperature by the heating inducer 200 as necessary.

The adsorbent 120 may have a large heating source absorption amount than those of materials positioned on the electromagnetic wave movement path 210. That is, the adsorbent 120 may have a high electromagnetic wave absorption rate than those of materials positioned on the electromagnetic wave movement path 210. Describing in another aspect, the adsorbent 120 may be formed of a material that more absorbs a heating source generated at the heating inducer 200 than that of at least one of the covering materials 130 and 140.

The adsorbent 120 may include a metal material. In detail, the adsorbent 120 may include at least one of alkali metal, alkali earth metal, zirconium (Zr), titanium (Ti), aluminum (Al), vanadium (V), barium (Ba), nickel (Ni), Cobalt (Co), palladium (Pd), niobium (Nb), and ferrite (Fe).

The adsorbent 120 can not effectively adsorb at least one of gases and water due to an oxide film formed on a surface at room temperature but may effectively adsorb at least one of gases and water when a thermal activation is performed through heating.

The adsorbent 120 may be preferably activated at 200° C. or more and 800° C. or less. Here, the oxide film on the surface of the adsorbent 120 is removed and at least one of gases and water reacts and are adsorbed.

The content of the adsorbent 120 may vary according to an initial vacuum rate in the vacuum insulation panel 100 but may be preferably 0.05 g or more and 5 g or less per unit area (0.1 m$^2$) of the covering materials 130 and 140.

As shown in FIG. 7, the adsorbent 120 may have various shapes.

Figure 7A:
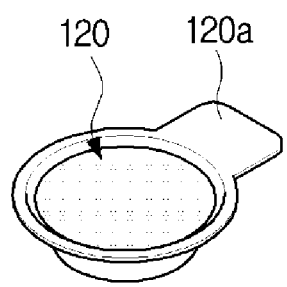
FIGS. 7a, 7b, 7c and 7d are views illustrating adsorbents applicable to the vacuum insulation panel according to the first embodiment of the present invention.
Figure 7B:
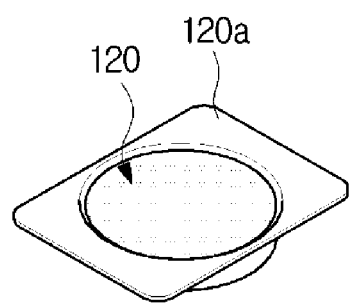

The adsorbent 120, as shown in FIGS. 7a and 7b, may be accommodated in a holder 120a of a metal material.

Figure 7C:
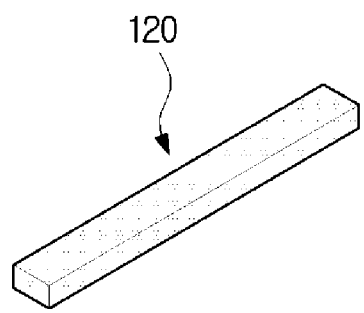
Figure 7D:
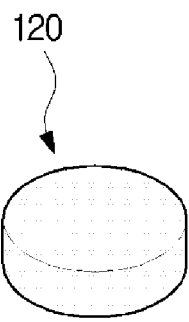

Also, the adsorbent 120, as shown in FIGS. 7c and 7d, may have a square pillar shape or a cylindrical shape.

Also, the adsorbent 120 may have a certain block shape or a rectangular parallelepiped shape.

Also, the adsorbent 120 may have a powder form.

The shape of the adsorbent 120 is not limited to the above example and may be variously changed.

The adsorbent 120 may include a catalyst.

The vacuum insulation panel 100 may further include the second adsorbent 190. The second adsorbent 190 may be disposed in the accommodation space 160 to remove water present in the accommodation space 160 with the adsorbent 120. Although the second adsorbent 190 generally adsorbs and removes water, but a function of the second adsorbent 190 is not limited to water removal. For example, the second adsorbent 190 may adsorb and remove not only water but also gases which penetrate the vacuum insulation panel 100.

The second adsorbent 190 may include at least one of calcium oxide (CaO), magnesium carbonate (MgCO$_3$), barium oxide (BaO), molecular sieve, magnesium oxide (MgO), calcium chloride (CaCl$_2$), activated carbon, silica gel, activated alumina, and zeolite.

To provide excellent water adsorption performance, the second adsorbent 190 may preferably have a specific surface area of 5 m$^2$/g or more.

In the graph of FIG. 6c, an x-axis indicates time and a y-axis indicates adsorption of the second adsorbent 190. The adsorption of the second adsorbent 190 is indicated by a mass increase % of the second adsorbent 190. The unit of time is "hour", and the unit of adsorption of the second adsorbent 190 is %. The graph of FIG. 6c is derived based on an experimental result in condition in which calcium oxide is used as the second adsorbent 190 and relative humidity is 20%.

First calcium oxide has a specific surface area of 0.84 m$^2$/g, and second calcium oxide has a specific surface area of 0.17 m$^2$/g. Third calcium oxide has a specific surface area of 3.1 m$^2$/g, and fourth calcium oxide has a specific surface area of 10.58 m$^2$/g. Fifth calcium oxide has a specific surface area of 16.54 m$^2$/g.

It may be checked through the graph in FIG. 6c that as the specific surface area of calcium oxide becomes greater, an adsorption speed with respect to a target material becomes higher. This is, as the specific surface area of calcium oxide becomes larger, a surface area of calcium oxide capable of instantaneously reacting to the target material becomes larger in such a way that reactivity of calcium oxide with respect to the target material is excellent.

Accordingly, the specific surface area of the second adsorbent 190, in detail, the specific surface area of calcium oxide may be preferably 5 m$^2$/g or more.

However, the specific surface area of the second adsorbent 190, in detail, the specific surface area of calcium oxide is not limited to 5 m$^2$/g or more and may be variously changeable due to a reason in design of the vacuum insulation panel 100.

The content of the second adsorbent 190 may vary according to an initial vacuum rate in the vacuum insulation panel 100 but may be preferably 3 g or more and 10 g or less per unit area (0.1 m$^2$) of the covering materials 130 and 140.

As described above, the vacuum insulation panel 100 may further include the electromagnetic wave movement path 210. The electromagnetic wave generated by the heating inducer 200 may move along the electromagnetic wave movement path 210 and may be transferred to the adsorbent 120. A material having a smaller heating source absorption amount than that of the adsorbent 120 may be disposed on the electromagnetic wave movement path 210. This is for intensively heating only the adsorbent 120 using the electromagnetic wave generated by the heating inducer 200.

At least one part of the first covering material 130 may have a smaller heating source absorption amount than that of the adsorbent 120. In detail, the first covering material 130 may include a first part 130a and a second part 130b. The first part 130a may be positioned on the electromagnetic wave movement path 210 and may have a smaller heating source absorption amount than that of the adsorbent 120.

The second part 130b may be positioned outside the electromagnetic wave movement path 210 and may be connected to the first part 130a.

A part of the shielding layer 170 positioned on the electromagnetic wave movement path 210 may be formed of a material that less absorbs a heating source than the adsorbent 120. Another part of the shielding layer 170 positioned outside the electromagnetic wave movement path 210 may include a metal material.

Describing in another aspect, the shielding layer 170 may be discontinuously disposed in a longitudinal direction L (refer to FIG. 6) of the vacuum insulation panel 100 to be positioned outside the electromagnetic wave movement path 210. This is based on a case in which the shielding layer 170 is formed of a metal material.

Figure 12:
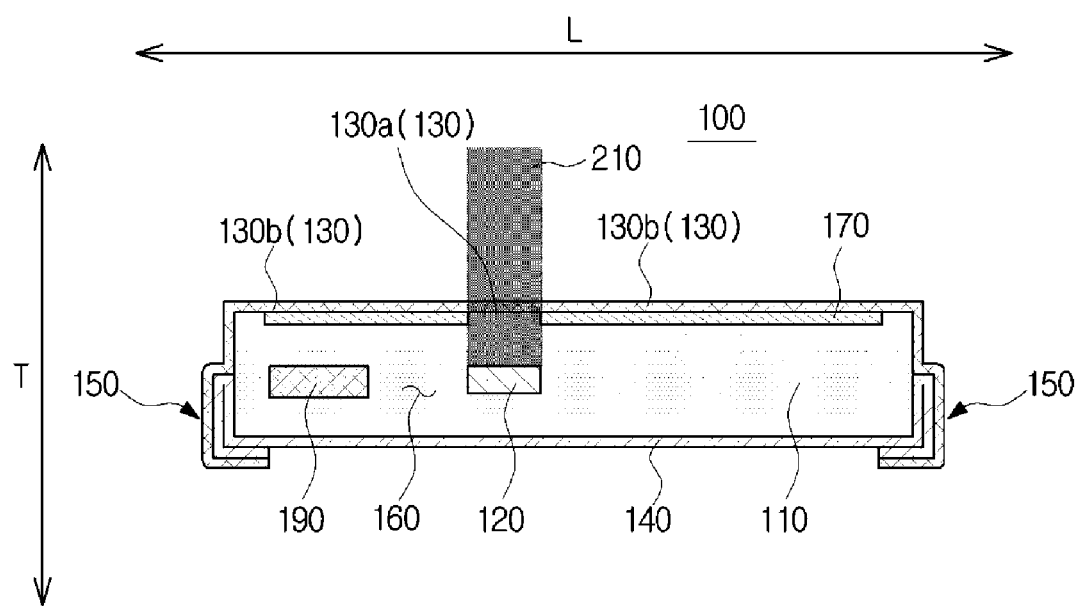
FIG. 12 is a cross-sectional view illustrating a state in which the extension portion of the vacuum insulation panel according to the first embodiment of the present invention is bent.

FIG. 12 is a cross-sectional view illustrating a state in which the extension portion of the vacuum insulation panel according to the first embodiment of the present invention is bent. Reference numerals not shown will be described with reference to FIGS. 6a to 11.

As shown in FIG. 12, the extension portion 150 of the vacuum insulation panel 100 may be bent.

The extension portion 150 may be bent to allow the second covering material 140 to be positioned between the core material 110 and the first covering material 130. That is, the extension portion 150 may be bent to allow the first covering material 130 having a small heat transfer rate to be positioned outside the second covering material 140 having a great heat transfer rate. As described above, the vacuum insulation panel 100 may be disposed between the inner casing 11 and the outer casing 13 to allow the first covering material 130 to be adhered to the inner surface of the outer casing 13 and insulation performance of the vacuum insulation panel 100 may be improved by bending the extension portion 150 to allow the second covering material 140 having a great heat transfer rate to be far away from the outer casing 13.

Figure 13:
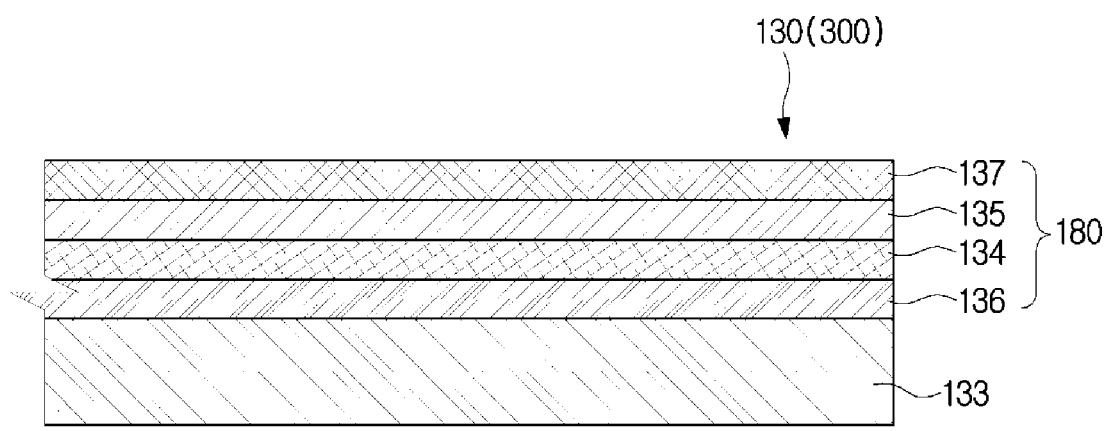
FIG. 13 is an enlarged cross-sectional view of a first covering material of a vacuum insulation panel according to a second embodiment of the present invention.

FIG. 13 is an enlarged cross-sectional view of a first covering material of a vacuum insulation panel according to a second embodiment of the present invention. Hereinafter, reference numerals (not shown) will be described with reference to FIG. 4. Hereinafter, a description overlapped with FIGS. 6a to 11 will be omitted.

As shown in FIG. 13, the at least one barrier layer 180 of the first covering material 130 of a vacuum insulation panel 300 according to the second embodiment may have a structure in which the base layer 134 and the deposition layer 135 positioned above the base layer 134 are stacked to face each other.

The at least one barrier layer 180 may further include a penetration-prevention layer 136.

The penetration-prevention layer 136 may be provided between the melting layer 133 and the base layer 134.

The penetration-prevention layer 136 may include at least one of EVOH and vacuum metalized (VM)-EVOH.

The at least one barrier layer 180 may further include a protection layer 137.

The protection layer 137 may be disposed at the outermost part of the first covering material 130 toward the outside of the core material 110.

The protection layer 137 performs a function of protecting the surface or the core material 110 in the vacuum insulation panel 300 from an external shock by absorbing and dispersing the external shock. Accordingly, the protection layer 137 may be formed of a material having excellent shock resistance.

The protection layer 137 may include at least one of PET, OPP, nylon, and oriented nylon.

A second covering material (not shown) of the vacuum insulation panel 300 according to the second embodiment and the first covering material 130 may have the same or different heat transfer rates. Since the second covering material is not positioned on the electromagnetic wave movement path 210, it is irrelevant whether the second covering material has a greater heating source absorption amount than that of the adsorbent 120 or the same heating source absorption amount as that of the adsorbent 120. Also, the second covering material may have a smaller heating source absorption amount than that of the adsorbent 120.

The vacuum insulation panel 300 according to the second embodiment may further include the adsorbent 120 disposed in the accommodation space 160. Since the adsorbent 120 has been described above with reference to FIGS. 6a to 11, a repeated description thereof will be omitted.

The vacuum insulation panel 300 according to the second embodiment may further include the second adsorbent 190. Since the second adsorbent 190 has been described above with reference to FIGS. 6a to 11, a repeated description thereof will be omitted.

Figure 14:
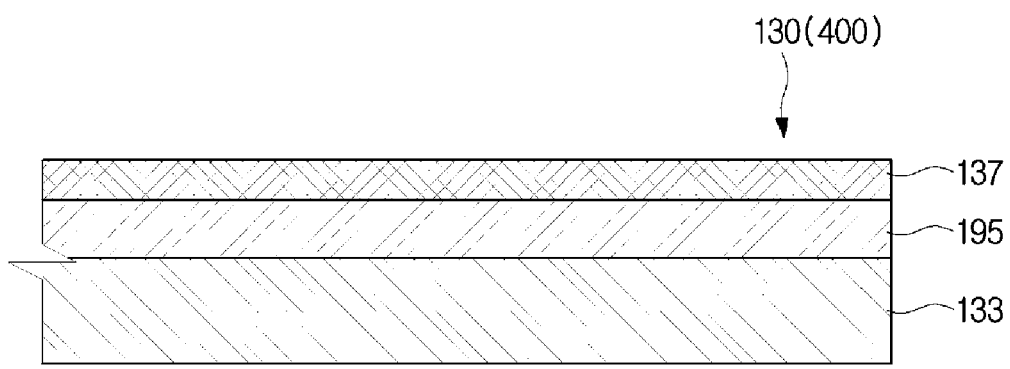
FIG. 14 is an enlarged cross-sectional view of a first covering material of a vacuum insulation panel according to a third embodiment of the present invention.

FIG. 14 is an enlarged cross-sectional view of a first covering material of a vacuum insulation panel according to a third embodiment of the present invention. Hereinafter, reference numerals (not shown) will be described with reference to FIG. 4. Hereinafter, a description overlapped with FIGS. 6a to 11 will be omitted.

As shown in FIG. 14, the first covering material 130 of a vacuum insulation panel 400 according to the third embodiment may include the melting layer 133 disposed to face the accommodation space 160 in a thickness direction T (refer to FIG. 6a of the vacuum insulation panel 400).

Since the melting layer 133 has been described above with respect to the first embodiment, a repeated description thereof will be omitted.

The first covering material 130 may further include a inflow-prevention layer 195. The inflow-prevention layer 195 may be provided on the melting layer 133 to prevent at least one of gases and water from flowing toward the core material 110. The inflow-prevention layer 195 may be disposed between the melting layer 133 and the protection layer 137.

The inflow-prevention layer 195 may include at least one of silicon dioxide ($SiO_2$), $Al_2O_3$, EVOH, PVA, and polyketone.

The first covering material 130 may further include the protection layer 137. The protection layer 137 may be disposed to face the melting layer 133 with the inflow-prevention layer 195 therebetween. The protection layer 137 may be disposed at the outermost part of the first covering material 130 in the thickness direction T (refer to FIG. 6a) of the vacuum insulation panel 400. Since the protection layer 137 has been described above with respect to the first embodiment, a repeated description thereof will be omitted.

As described above, at least one part of the first covering material 130 positioned on the electromagnetic wave movement path 210 has a smaller heating source absorption amount than that of the adsorbent 120 inserted in the accommodation space 160. Accordingly, it is possible to selectively heat only the adsorbent 120 using the heating inducer 200.

A second covering material (not shown) of the vacuum insulation panel 400 according to the third embodiment and the first covering material 130 may have the same or different heat transfer rates. Since the second covering material is not positioned on the electromagnetic wave movement path 210, it is irrelevant whether the second covering material has a greater heating source absorption amount than that of the adsorbent 120 or the same heating source absorption amount as that of the adsorbent 120. Also, the second covering material may have a smaller heating source absorption amount than that of the adsorbent 120.

The vacuum insulation panel 400 may further include the shielding layer 170.

The shielding layer 170 may be disposed between at least one of the first covering material 130 and the second covering material 140 and the core material 110 to prevent at least one of gases and water from penetrating the accommodation space 160.

Preferably, the shielding layer 170 may be installed on the inner surfaces of the covering materials 130 and 140 which at least one of gases and water relatively easily penetrate.

The shielding layer 170 may include at least one of metal foil, an inorganic deposition film, and a polymer resin.

When the shielding layer 170 includes metal foil and is disposed between the first covering material 130 and the core material 110, the shielding layer 170 may be discontinuously disposed in a longitudinal direction L of the vacuum insulation panel 400 to be positioned outside the electromagnetic wave movement path 210.

Figure 15:
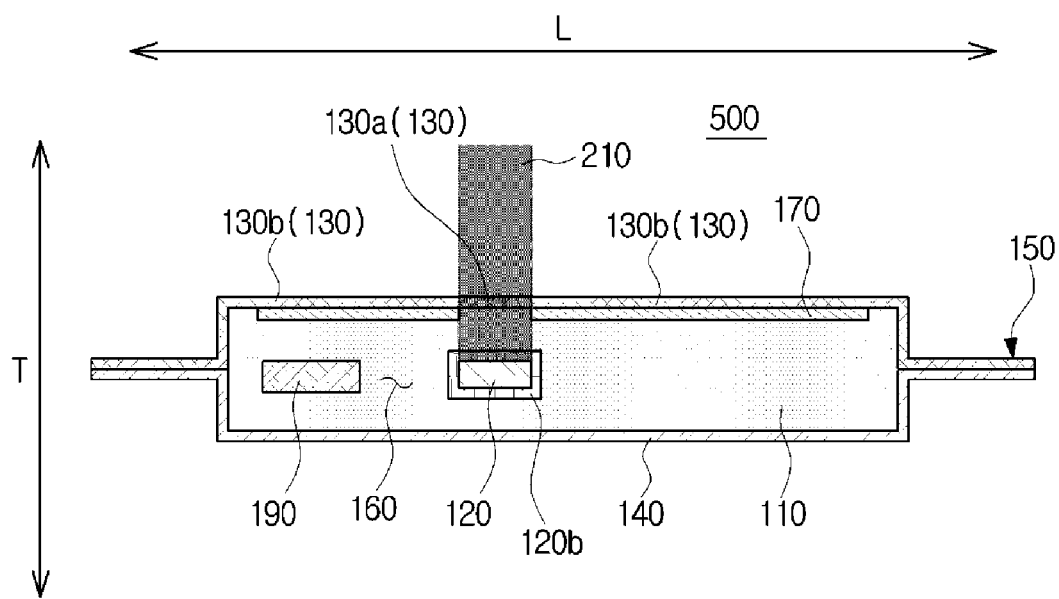
FIG. 15 is a cross-sectional view illustrating a vacuum insulation panel according to a fourth embodiment of the present invention.

FIG. 15 is a cross-sectional view illustrating a vacuum insulation panel according to a fourth embodiment of the present invention. Hereinafter, reference numerals (not shown) will be described with reference to FIG. 4. Hereinafter, a description overlapped with FIGS. 6a to 11 will be omitted.

As shown in FIG. 15, a vacuum insulation panel 500 may further include a cover 120b that encloses the adsorbent 120.

The cover 120b may enclose the adsorbent 120 not to interfere in activation of the adsorbent 120 at a high temperature and to prevent heat generated by the activated adsorbent 120 from being transferred to the core material 110.

The cover 120b may have a porous material.

The material of the cover 120b may include at least one of inorganic fiber and organic fiber.

The inorganic fiber, for example, may include glass fiber, basalt fiber, fumed silica and the like.

Since the organic fiber has low heat conductivity, only the organic fiber may be used as a material of the cover 120b but heat transfer caused by radiation may be effectively prevented when being mixed with carbon and the like.

Since the first covering material 130 and the second covering material 140 of the vacuum insulation panel 500 have been described with reference to FIGS. 6a to 11, a repeated description thereof will be omitted.

Figure 16:
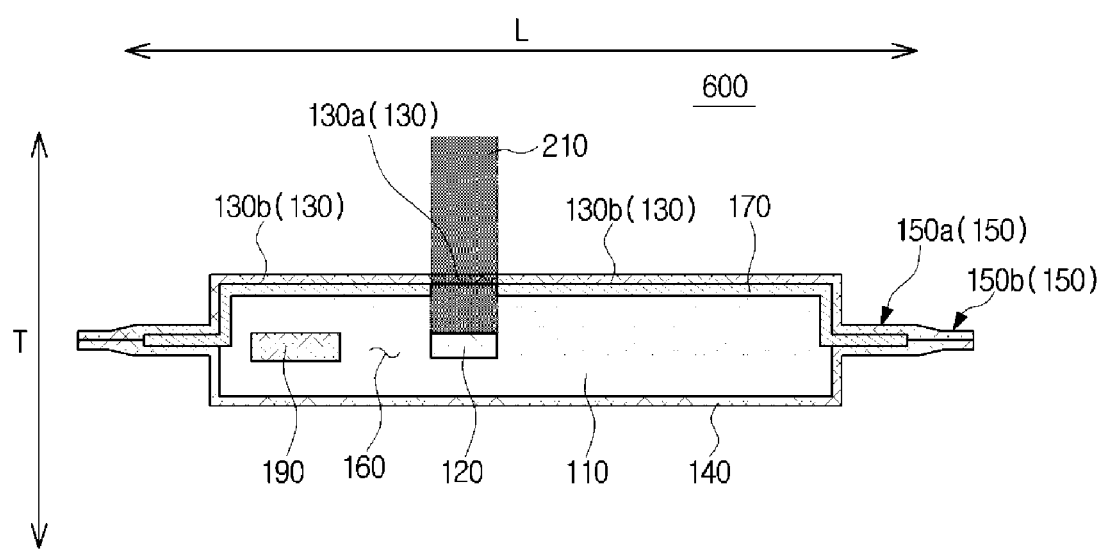
FIG. 16 is a cross-sectional view illustrating a vacuum insulation panel according to a fifth embodiment of the present invention.

FIG. 16 is a cross-sectional view illustrating a vacuum insulation panel according to a fifth embodiment of the present invention. Hereinafter, reference numerals (not shown) will be described with reference to FIG. 4. Hereinafter, a description overlapped with FIGS. 6a to 11 will be omitted.

As shown in FIG. 16, a vacuum insulation panel 600 may further include the shielding layer 170 disposed between the first covering material 130 and the second covering material 140 to prevent at least one of gases and water from passing through at least one of the first covering material 130 and the second covering material 140 and penetrating the accommodation space 160.

The shielding layer 170 may be selectively disposed.

The shielding layer 170 may be adhered to at least one of the first covering material 130 and the second covering material 140 to be integrated with the at least one of the first covering material 130 and the second covering material 140.

The extension portion 150 may include the shielding layer 170.

The extension portion 150 may include an inner portion 150a on which the shielding layer 170 is disposed and an outer portion 150b positioned outside the inner portion 150a in a longitudinal direction L of the vacuum insulation panel 600.

The shielding layer 170 may be disposed on the inner portion 150a between the first covering material 130 and the second covering material 140.

The shielding layer 170 may be adhered to at least one of the first covering material 130 and the second covering material 140 at the inner portion 150a.

The first covering material 130 and the second covering material 140 may be adhered to each other at the outer portion 150b.

The shielding layer 170 may be bent with at least one of the first covering material 130 and the second covering material 140.

A part of the shielding layer 170 positioned on the electromagnetic wave movement path 210 may be formed of a material that less absorbs a heating source than the adsorbent 120. Another part of the shielding layer 170 positioned outside the electromagnetic wave movement path 210 may include a metal material.

Describing in another aspect, the shielding layer 170 may be discontinuously disposed in the longitudinal direction L of the vacuum insulation panel 600 to be positioned outside the electromagnetic wave movement path 210. This is based on a case in which the shielding layer 170 is formed of a metal material.

Figure 17:
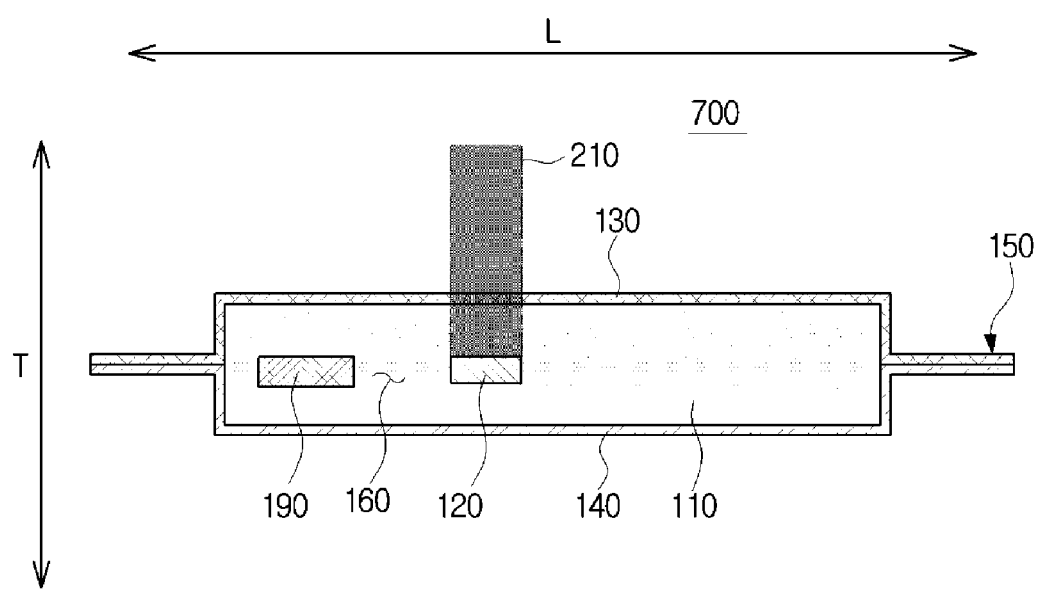
FIG. 17 is a cross-sectional view illustrating a vacuum insulation panel according to a sixth embodiment of the present invention.

FIG. 17 is a cross-sectional view illustrating a vacuum insulation panel according to a sixth embodiment of the present invention. Hereinafter, reference numerals (not shown) will be described with reference to FIG. 4. Hereinafter, a description overlapped with FIGS. 6a to 11 will be omitted. In FIG. 17, a case in which the first covering material 130 and the second covering material 140 have the same heat transfer rates will be mainly described.

The first covering material 130 of a vacuum insulation panel 700 according to the sixth embodiment may include a nonmetal deposition covering material.

The second covering material 140 of the vacuum insulation panel 700 according to the sixth embodiment may include a nonmetal deposition covering material.

The first covering material 130 and the second covering material 140 may be coupled with each other to form the extension portion 150 that extends outward from the accommodation space 160. The extension portion 150 may be formed to extend from both sides of the core material 110 toward the outside of the accommodation space 160. The first covering material 130 and the second covering material 140 may be adhered to each other at the extension portion 150 to maintain the accommodation space 160 in which the core material 110 is accommodated, in a vacuum.

The first covering material 130 and the second covering material 140 may each include a coupling layer that faces the accommodation space 160 toward the inside of the core material 110. The coupling layer may mean at least one of the melting layer 133 and the sealing layer 141.

The coupling layer may include at least one of LLDPE, LDPE, HDPE, and CPP.

When both the first covering material 130 and the second covering material 140 are nonmetal deposition covering materials, penetration of at least one of gases and water may be reduced by disposing the shielding layer 170. Since the shielding layer 170 has been described with reference to FIGS. 6a to 11, a repeated description thereof will be omitted.

The extension portion 150 of the vacuum insulation panel 700 may be bent.

At least one part of the first covering material 130 may have a smaller heating source absorption amount than that of the adsorbent 120.

Figure 18:
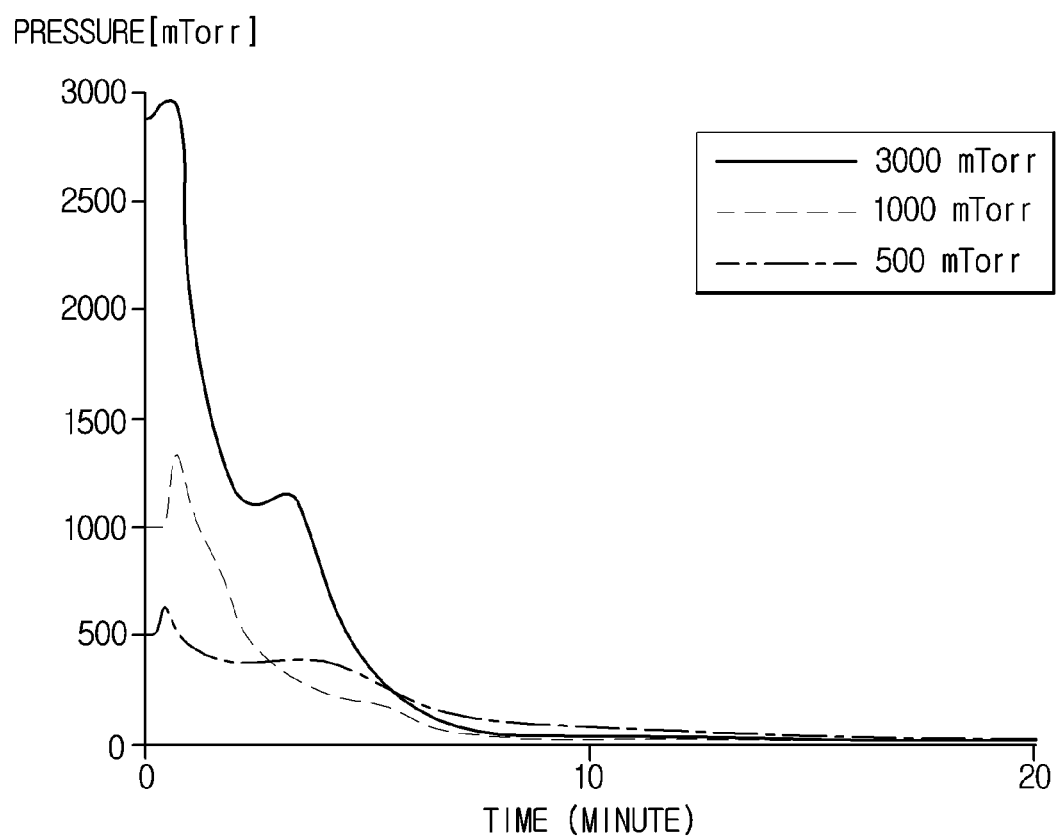
FIG. 18 is a graph illustrating a tendency in which the vacuum insulation panel having different initial pressures remains in a high vacuum due to heating of the adsorbent.

FIG. 18 is a graph illustrating a tendency in which the vacuum insulation panel having different initial pressures remains in a high vacuum due to heating of the adsorbent. An x-axis indicates time and a y-axis indicates internal pressure of the vacuum insulation panel. The unit of time is minute m, and the unit of internal pressure of the vacuum insulation panel is millitorr mTorr.

As shown in FIG. 18, even when the vacuum insulation panel has different initial pressures, the internal pressure of the vacuum insulation panel may be adequately decreased by activating the adsorbent. That is, even when the vacuum insulation panel has different initial pressures, a vacuum level in the vacuum insulation panel may be increased by activating the adsorbent.

The internal pressure of the vacuum insulation panel may be maintained at a 0.01 torr due to activation of the adsorbent.

FIG. 19 is a table in which a manufacturing time and a thermal conductivity coefficient k of the vacuum insulation panel according to the first embodiment of the present invention are compared with those of an existing vacuum insulation panel. The existing vacuum insulation panel refers to a general vacuum insulation panel using a glass fiber core material and an aluminum deposition covering material. Also, the existing vacuum insulation panel does not include an adsorbent activated at a high temperature. Here, the first covering material 130 shown in FIG. 8a is applied to the vacuum insulation panel 100 according to the first embodiment of the present invention.

Based on a vacuum insulation panel having a size of 290×410×12 mm$^3$, since a vacuum of the existing vacuum insulation panel is formed using a vacuum chamber, a manufacturing time is long. Also, the existing vacuum insulation panel has a relatively high thermal conductivity coefficient of 1.66.

On the other hand, as a result of several times of experiments performed using the vacuum insulation panel according to the first embodiment of the present invention, since the vacuum insulation panel according to the first embodiment of the present invention goes under a preliminary depressurization process in a vacuum chamber and a secondary depressurization process using a high-frequency induction heating method to be in a high vacuum, a manufacturing time thereof is short. Also, it was checked that the vacuum insulation panel according to the first embodiment of the present invention has a relatively smaller heat conductivity coefficient than that of the existing vacuum insulation panel. A small heat transfer coefficient means less heat transfer media, that is, an accommodation space formed in a high vacuum.

In conclusion, not only a manufacturing time of a vacuum insulation panel may be reduced using an adsorbent activated at a high temperature but also a vacuum level of the vacuum insulation panel may be easily increased limitlessly in number using a heating inducer.

The vacuum insulation panels 100, 300, 400, 500, 600, and 700 according to the present invention may be used for not only refrigerators but also various products that need heat insulation.

Particular embodiments have been illustrated and described above. However, it would be appreciated by those skilled in the art that various changes may be made without departing from the technical concept of the present invention defined in the claims.

The invention claimed is:

1. A refrigerator comprising a vacuum insulation panel, wherein the vacuum insulation panel comprises:
   a core material;
   a covering material disposed outside the core material to form an accommodation space in which the core material is accommodated;
   a first adsorbent disposed in the accommodation space to be activated at a temperature higher than room temperature and to remove at least one of gases and water present in the accommodation space;
   a path on which an electromagnetic wave moves toward the adsorbent; and
   a shielding layer disposed in the accommodation space to prevent at least one of gases and water from penetrating the accommodation space, and having a portion discontinuously disposed in a longitudinal direction of the vacuum insulation panel to be positioned outside the path.

2. The refrigerator of claim 1, wherein the first adsorbent comprises a metal material.

3. The refrigerator of claim 2, wherein the first adsorbent comprises at least one of zirconium (Zr), titanium (Ti), aluminum (Al), vanadium (V), barium (Ba), nickel (Ni), and ferrite (Fe).

4. The refrigerator of claim 1, wherein the vacuum insulation panel further comprises a second adsorbent disposed in the accommodation space to remove water present in the accommodation with the first adsorbent.

5. The refrigerator of claim 4, wherein the second adsorbent comprises at least one of calcium oxide (CaO), magnesium carbonate (MgCO$_3$), barium oxide (BaO), molecular sieve, magnesium oxide (MgO), calcium chloride (CaCl$_2$), activated carbon, silica gel, activated alumina, and zeolite.

6. The refrigerator of claim 1, wherein the vacuum insulation panel further comprises a porous cover which encloses the first adsorbent to prevent heat generated by the first activated adsorbent from being transferred to the core material.

7. The refrigerator of claim 6, wherein a material of the cover comprises at least one of organic fiber and inorganic fiber.

8. A vacuum insulation panel comprising:
   a core material;
   a covering material disposed outside the core material to form an accommodation space in which the core material is accommodated;
   an adsorbent disposed in the accommodation space to be activated at a temperature higher than room temperature by an electromagnetic wave generated outside the covering material and to remove at least one of gases and water present in the accommodation space;
   a path on which the electromagnetic wave moves toward the adsorbent; and
   a shielding layer disposed in the accommodation space to prevent at least one of gases and water from penetrating the accommodation space, and having a first portion discontinuously disposed in a longitudinal direction of the vacuum insulation panel to be positioned outside the path.

9. The vacuum insulation panel of claim 8, wherein the adsorbent is spaced apart from the covering material.

10. The vacuum insulation panel of claim 8, wherein the adsorbent comprises a metal material.

11. The vacuum insulation panel of claim 8, wherein the covering material comprises:
   a first covering material that comprises a part through which the electromagnetic wave passes; and
   a second covering material coupled with the first covering material to form the accommodation space.

12. The vacuum insulation panel of claim 11, wherein the first covering material comprises:
   a melting layer disposed to face the accommodation space in a thickness direction of the vacuum insulation panel;
   an inflow-prevention layer disposed on the melting layer to prevent at least one of gases and water from flowing toward the core material; and
   a protection layer disposed to face the melting layer with the inflow-prevention layer therebetween,
   wherein the inflow-prevention layer comprises at least one of silicon dioxide ($SiO_2$), alumina ($Al_2O_3$), ethylene vinyl alcohol (EVOH), polyvinyl alcohol (PVA), and polyketone.

13. The vacuum insulation panel of claim 12, wherein the shielding layer is disposed in the accommodation space between the core material and the melting layer.

14. The vacuum insulation panel of claim 13, wherein the shielding layer includes a second portion positioned on the path and is formed of a material that less absorbs the electromagnetic wave than the adsorbent.

15. The vacuum insulation panel of claim 14, wherein the first portion of the shielding layer positioned outside the path comprises a metal material.

16. A vacuum insulation panel comprising:
   a core material;
   a covering material disposed outside the core material to form an accommodation space in which the core material is accommodated;
   a first adsorbent disposed in the accommodation space, spaced apart from the covering material, and heated at a temperature higher than room temperature to remove at least one of gases and water present in the accommodation space;
   a path on which an electromagnetic wave moves toward the adsorbent; and
   a shielding layer disposed in the accommodation space to prevent at least one of gases and water from penetrating the accommodation space, and having a portion discontinuously disposed in a longitudinal direction of the vacuum insulation panel to be positioned outside the path.

17. The vacuum insulation panel of claim 16, wherein the first adsorbent is activated at a temperature higher than room temperature by an electromagnetic wave generated outside the covering material.

18. The vacuum insulation panel of claim 17, wherein at least one part of the covering material has a lower electromagnetic wave absorption rate than that of the first adsorbent.

19. The vacuum insulation panel of claim 17, further comprising an electromagnetic wave movement path on which the electromagnetic wave moves toward the first adsorbent to be transferred to the first adsorbent,
   wherein the covering material comprises:
   a first covering material that comprises a part through which the electromagnetic wave passes; and
   a second covering material coupled with the first covering material to form the accommodation space.

* * * * *